United States Patent
Nesbitt et al.

(10) Patent No.: US 11,327,010 B2
(45) Date of Patent: May 10, 2022

(54) INFRARED LIGHT TRANSMISSION INSPECTION FOR CONTINUOUS MOVING WEB

(71) Applicant: 3M INNOVATIVE PROPERTIES COMPANY, St. Paul, MN (US)

(72) Inventors: Joseph R. Nesbitt, Sioux Falls, SD (US); Steven P. Floeder, Shoreview, MN (US); Michael L. Ruegsegger, Woodbury, MN (US); Crystal A. Dehn, Maplewood, MN (US); Arthur L. Kotz, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 76 days.

(21) Appl. No.: 16/965,632

(22) PCT Filed: Jan. 28, 2019

(86) PCT No.: PCT/IB2019/050677
§ 371 (c)(1),
(2) Date: Jul. 29, 2020

(87) PCT Pub. No.: WO2019/150242
PCT Pub. Date: Aug. 8, 2019

(65) Prior Publication Data
US 2021/0041355 A1     Feb. 11, 2021

Related U.S. Application Data

(60) Provisional application No. 62/624,266, filed on Jan. 31, 2018.

(51) Int. Cl.
*G01N 21/3563*     (2014.01)
*G01N 21/359*     (2014.01)
(Continued)

(52) U.S. Cl.
CPC ....... *G01N 21/3563* (2013.01); *G01N 21/359* (2013.01); *G01N 21/86* (2013.01);
(Continued)

(58) Field of Classification Search
CPC .. G01N 21/3563; G01N 21/359; G01N 21/86; G01N 21/8806; G01N 2201/12753; G01N 21/89
See application file for complete search history.

(56) References Cited

U.S. PATENT DOCUMENTS 2,801,185 A     7/1957    Iler
3,347,954 A    10/1967    Bredereck
(Continued)

FOREIGN PATENT DOCUMENTS

CA     2346480 C    *   2/2009           G01N 21/86
CN     103049413          4/2013
(Continued)

OTHER PUBLICATIONS

Arbuzov, "Structure of reaction products of some α,β-unsaturated carbonyl compounds with trimethyl phosphite and tri(demethylamino) phosphine", Organic and biological chemistry, pp. 819-824.
(Continued)

*Primary Examiner* — Christine S. Kim

(57) ABSTRACT

System and technique for inspecting a moving film by measuring the levels of light transmission through a thickness dimension of the film are described. The system includes a light source configured to provide light including a particular wavelength, or a particular range of wavelengths. The light from the light source is directed toward a first surface of the film, and an image capturing device is located adjacent to the light source on a second side of the film opposite the first surface, the image capturing device configured to measure the levels of light intensity exiting a
(Continued)

second surface of the film. Measurements of the level of the light intensity passing through the film may be spatially synchronized to physical positions along the film to generated at least one roll map indicative of light transmission characteristics of the film over the imaged portions of the film.

2 Claims, 8 Drawing Sheets

(51) Int. Cl.
G01N 21/86 (2006.01)
G01N 21/88 (2006.01)
(52) U.S. Cl.
CPC .............. *G01N 21/8806* (2013.01); *G01N 2201/12753* (2013.01)

(56) References Cited

U.S. PATENT DOCUMENTS

| | | | |
|---|---|---|---|
| 3,496,250 A | 2/1970 | Czerwinski | |
| 3,835,332 A * | 9/1974 | Bridges | G01N 21/8903 250/559.04 |
| 4,503,169 A | 3/1985 | Randklev | |
| 4,522,958 A | 6/1985 | Das | |
| 5,073,712 A * | 12/1991 | Hellstrom | G01N 21/8901 250/252.1 |
| 5,657,402 A | 8/1997 | Bender | |
| 5,920,657 A | 7/1999 | Bender | |
| 6,586,483 B2 | 7/2003 | Kolb | |
| 7,074,839 B2 | 7/2006 | Fansler | |
| 7,090,721 B2 | 8/2006 | Craig | |
| 7,090,722 B2 | 8/2006 | Budd | |
| 7,156,911 B2 | 1/2007 | Kangas | |
| 7,235,775 B2 | 6/2007 | Masaki | |
| 7,342,047 B2 | 3/2008 | Lewandowski | |
| 7,542,821 B2 | 6/2009 | Floeder | |
| 7,598,298 B2 | 10/2009 | Lewandowski | |
| 7,623,699 B2 | 11/2009 | Floeder | |
| 7,649,029 B2 | 1/2010 | Kolb | |
| 7,797,133 B2 | 9/2010 | Floeder | |
| 7,974,459 B2 | 7/2011 | Floeder | |
| 9,322,786 B2 | 4/2016 | Takami | |
| 9,719,939 B2 | 8/2017 | Krebs | |
| 2006/0071156 A1 | 4/2006 | Masaki | |
| 2007/0057208 A1 | 3/2007 | Joss | |
| 2009/0159799 A1 | 6/2009 | Copeland | |
| 2009/0303484 A1* | 12/2009 | Hofeldt | B65H 43/00 356/431 |
| 2011/0043691 A1 | 2/2011 | Guitteny | |
| 2011/0069878 A1 | 3/2011 | Case | |
| 2013/0083324 A1* | 4/2013 | Wilhelm | G01N 21/89 356/431 |
| 2015/0284601 A1 | 10/2015 | Yurt | |
| 2016/0185993 A1 | 6/2016 | Yoshida | |
| 2016/0369115 A1 | 12/2016 | Shimoju | |

FOREIGN PATENT DOCUMENTS

| | | | |
|---|---|---|---|
| DE | 3639636 | 5/1988 | |
| DE | 102012101310 | 4/2013 | |
| EP | 0052813 | 6/1982 | |
| EP | 1348946 | 10/2003 | |
| EP | 1712897 | 10/2006 | |
| EP | 2177947 | 4/2010 | |
| EP | 2208355 | 7/2010 | |
| GB | 2147413 A * | 5/1985 | ............ G01N 21/86 |
| JP | 63290867 | 11/1988 | |
| WO | WO-0004374 A1 * | 1/2000 | ............ G01N 21/89 |
| WO | WO-2005075330 A2 * | 8/2005 | ............ B65C 9/42 |
| WO | WO 2007-140440 | 12/2007 | |
| WO | WO 2008-024611 | 2/2008 | |
| WO | WO 2009-014940 | 1/2009 | |
| WO | WO 2014-078115 | 5/2014 | |
| WO | WO 2014-151650 | 9/2014 | |
| WO | WO 2014-172530 | 10/2014 | |
| WO | WO 2015-200007 | 12/2015 | |
| WO | WO 2016-014218 | 1/2016 | |
| WO | WO 2016-044151 | 3/2016 | |
| WO | WO 2016-053877 | 4/2016 | |
| WO | WO 2016-137317 | 9/2016 | |
| WO | WO 2017-095704 | 6/2017 | |
| WO | WO 2018-215889 | 11/2018 | |
| WO | WO 2019-150243 | 8/2019 | |
| WO | WO 2019-152187 | 8/2019 | |
| WO | WO 2019-152267 | 8/2019 | |

OTHER PUBLICATIONS

Klan, "Photoremovable Protecting Groups in Chemistry and Biology: Reaction Mechanisms and Efficiency", Chem Reviews, 2013, vol. 113, pp. 119-191.

Matyjaszewski, "Atom transfer radical polymerization", Chem. Rev., 2001, vol. 101, pp. 2921-2990.

Pelliccioli, "Photoremovable protecting groups: reaction mechanisms and applications", Photochem Photobiol Sci.,2002, vol. 1, pp. 441-458.

Seibert, "Flat field correction technique for digital detectors", Medical Imaging 1998: Physics of medical imaging, 1998, vol. 3336, pp. 348-354.

Senda, "Uracil derivatives and related compounds IX Synthesis of Bucolomes related compounds" 1969, vol. 89, pp. 266-271.

Sidky, "Organophosphorous compounds. XXV Reactivity of Benzlidenebarbituric Acid Towards Tervalent Phosphorous Compounds" Egypt J. Chem, 1978, vol. 21, No. 1, pp. 37-46.

Wu, "Mode of Action of 4-Hydroxyphenylpyruvate Dioxygenase Inhibition by Triketone-type Inhibitors", J. Med. Chem., 2002, vol. 45, pp. 2222-2228.

Xu, "Industrial web inspection for manufacturing process understanding and control", Machine vision application in industrial inspection, 1999, vol. 3652, pp. 10-20.

Yong, "Photochemistry of 2-Nitrobenzyl Enol Ethers: Oxidative C=C Bond Scission", Org. Lett., 2005, vol. 7, No. 12, pp. 2485-2487.

International Search report for PCT International Application No. PCT/IB2019/050677 dated Jul. 1, 2019, 7 pages.

* cited by examiner

INFRARED LIGHT TRANSMISSION INSPECTION FOR CONTINUOUS MOVING WEB

CROSS REFERENCE TO RELATED APPLICATIONS

This application is a national stage filing under 35 U.S.C. § 371 of PCT/IB2019/050677, filed Jan. 28, 2019, which claims the benefit of Provisional Application No. 62/624,266, filed Jan. 31, 2018, the disclosures of which are incorporated by reference in their entirety herein.

BACKGROUND

Manufacturing processes for making various types of films (e.g., transparent polyester films and multi-layered films) often involve manufacturing the films in a long continuous sheet(s), referred to as a web. The web itself is generally a material having a fixed dimension in one direction ("cross-web direction"), either a predetermined or indeterminate length in the orthogonal direction ("down-web direction"), and a nominal thickness dimension between a top and bottom planar surfaces of the film. During the various manufacturing processes used in making and handling the web, the web may be conveyed along a longitudinal axis running in parallel to the length dimension (down-web direction) of the web, and perpendicular to the width dimension (cross-web direction) of the web. Various means are used to convey the web during the manufacturing process, such as rollers or other types of support mechanisms.

At some point in the process of manufacturing the final product where the film is utilized, the web may be partitioned into individual portions of the web material to form "parts" from the web. The parts may include pieces of the web material having a shape, such as a rectangular-shaped perimeter, and may or may not include cutout portions void of the web material formed within the shape. Once converted from the web material, the part may be applied to a device, such as a computer monitor screen or a display screen of a mobile device (e.g., a smart phone) as a film layer that covers some portion of an exterior surface of the device.

Depending on the particular application, each individual piece of the web material utilized in a final product, or some quantity of the web material itself (e.g., a roll of the film) may need to comply to one or more criteria related to certain physical and/or functional characteristics. For example, the level of transmission of light through a thickness dimension of the film at various wavelengths, or within a particular range or ranges of wavelengths, may be a performance characteristic dictated by a customer, and/or may be dictated by some other regulatory requirements, and which may be applicable to each piece of the web material that is eventually rendered into a final product (e.g., a part) for a particular application where the film is being used. Various types and/or levels of inspection of the web material itself, or of the individual portions of the web material that are to be utilized in the final product, may need to be performed on the web material and/or on the individual pieces of the web material that will be or are already converted into a part to assure and/or certify compliance to these customer and/or regulatory requirements.

SUMMARY

The systems, devices, and methods described herein provide techniques for measurement of light transmission properties of a film at high speeds (e.g., while a film is continuously moving through an inspection station), and which may include inspection of large portions (e.g., 100%) of the film during manufacturing of the film. Measurement of the light transmission properties of a film may include determining the levels of transmission of light within a certain wavelength, or within a range or different ranges of wavelengths of light, that are generated by a light source and transmitted through the film. Light including the wavelength or a range of wavelengths of interest are generated by a light source and directed toward the film so that a level of the light that is transmitted through the film, for example, though a thickness dimension of the film, can be measured. Determining the levels of light from the light source that are transmitted through a film within the wavelength or range of wavelengths of interest includes capturing, using light sensor(s), a level of light intensity transmitted through the film over a plurality of imaging areas of the film, and determining a corresponding position along the film that spatially synchronizes the measured levels of light intensity with the physical positions along the film, both in the cross-web and in the down-web dimensions of the film, where the light intensity levels were measured.

Using the measured levels of light intensities transmitted through the film and the spatially synchronizing data that relates the measured levels to particular physical locations of the film, various versions of roll maps for the film may be generated by the system. The roll maps may provide a continuous representation of the light transmission values for the film that are spatially synchronized relative to at least one mark indicative of physical positions along the film. Information included in the roll map may indicate areas of the film that do and that do not comply with a user determinable threshold level for the measured levels of light transmission for each imaged area of the film. Moreover, the roll map may be rendered as a graphical image including positional information or indicators relative to the physical markings on the web. The information specified by or otherwise associated with such a roll map in spatial synchronization to physical positions on the film may be used to control a conversion of the film used to separate pieces of the film from the web to form parts (e.g., a set of products), such that only portions of the film that meet the threshold level for light transmission are utilized in the parts being converted from the film. In addition, the data associated with the roll map(s) can be provided as feedback data, for example, in real-time or with some time delay, to one or more manufacturing processes used to produce the film. The feedback information may be used to further control the manufacturing process in order to provide quality control to the manufacturing process. Such feedback may also be used in conjunction with an automated conversion process used to convert parts from the film in an online manufacturing application that helps assure the quality of all parts being converted from the film, for example, with respect to customer and/or regulatory requirements related to the light transmission characteristics of the parts being converted from the film.

As one example, the disclosure is directed to a method for inspecting a film, the method comprising transmitting light from a light source through the film while advancing the film past an image capturing device and the light source, and capturing, by a light sensor array of the image capturing device, electrical signals corresponding to a level of light intensity transmitted through the film for each of a plurality of image areas of the film. The method further includes analyzing, by processing circuitry, the captured electrical signals to determine a light transmission quantification value corresponding to the level of light intensity transmitted through the film for each of the plurality of image area, and determining, relative to at least one marking on the film and by the processing circuitry, a corresponding position on the film for each of the plurality of image areas to spatially synchronize the light transmission quantification values to the film. The method also includes generating, by the processing circuitry, a roll map for the film, wherein the roll map provides a continuous representation of the light transmission quantification values for the plurality of image areas and is spatially synchronized to the at least one marking on the film for controlling conversion of the film into a plurality of parts.

As another example, the disclosure is directed to a system for inspecting a film, the system comprising a light source configured to generate light having at least one wavelength, and to direct the light generated by the light source to a first surface of the film while the film is advanced past the light source, and an image capturing device positioned to capture light and to measure a level of light intensity of the light generated by the light source after the light exits a second surface of the film opposite the first surface of the film after passing through a thickness dimension of the film, and a fiducial mark reader positioned to read at least one marking on the film and to output position data based on the at least marking. The system further includes at least one processor comprising processing circuitry configured to analyze the captured electrical signals to determine a light transmission quantification value corresponding to a level of light intensity transmitted through the film for each of a plurality of image area of the film, map the light transmission quantification value determined for each of the plurality of image areas to a corresponding position of the film using the position data to spatially synchronize the light transmission quantification value for each of the image areas to the film; and generate a roll map for the film representing the light transmission quantification values for the plurality of image areas that are spatially synchronized to the at least one marking on the film.

As another example, the disclosure is directed to a method of calibrating a film inspection system, the method comprising transmitting a light from a light source to an image capturing device of a film inspection system without a film present between the light source and the image capturing device, and capturing, by the image capturing device, a plurality of electronic signals corresponding to the variations in the level of light intensity imaged across an image area of the image capturing device. The method further includes applying a flat-field image correction to the electronic signals to equalize variations in the levels of light intensities captured across the imaged area, and storing image correction data generated using the flat-field image correction. The image correction data is for correction of measured levels of light transmission in films. The method includes applying the stored image correction data to sets of image data captured by the imaged capturing device generated by the image capturing device when imaging a film being advanced past the light source and the image capturing device.

Figure 1:
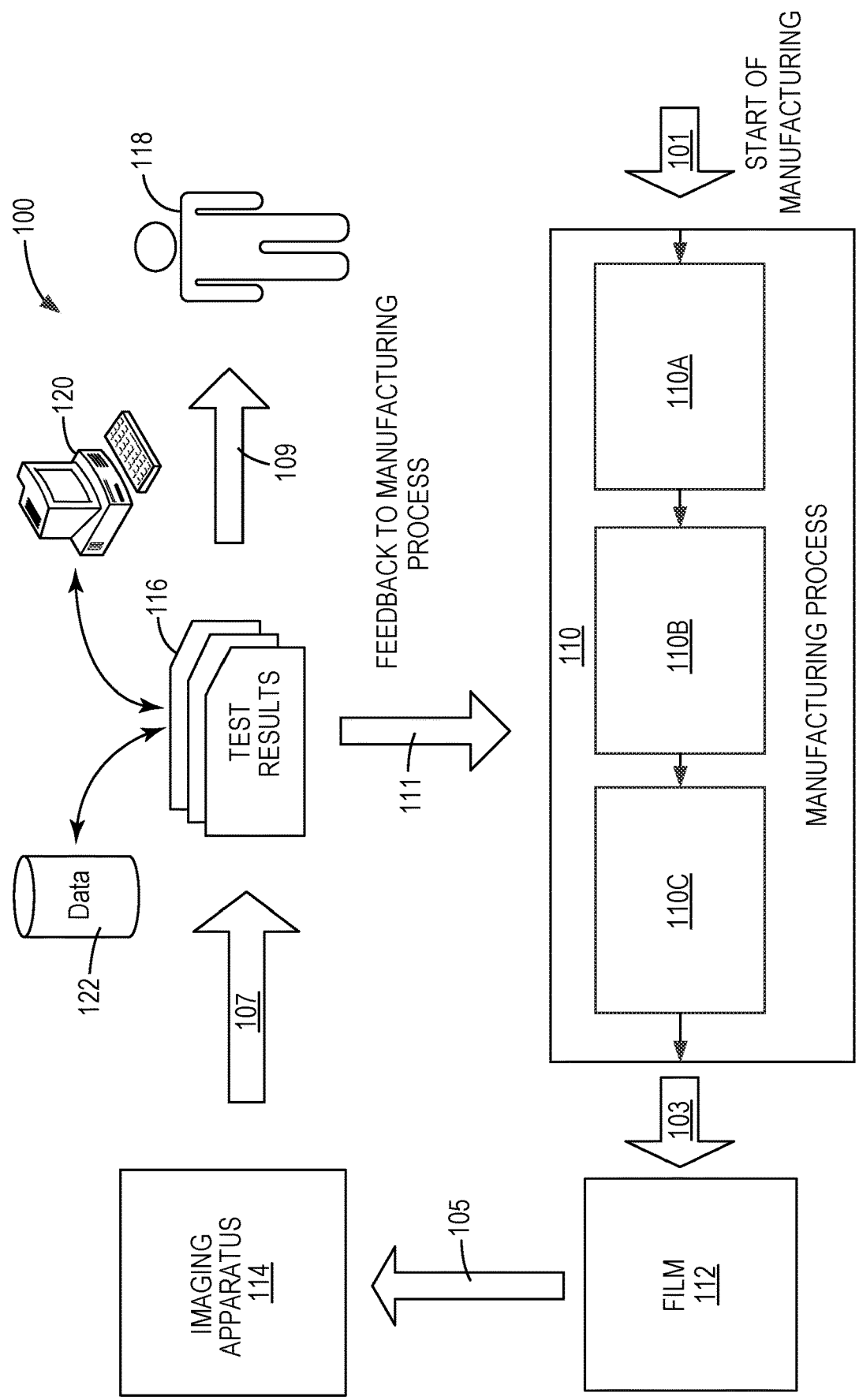
FIG. 1 is a functional block diagram illustrating an overview of a system for manufacturing a film and inspecting the film for light transmission characteristics in accordance with one or more exemplary implementations and techniques described in this disclosure.

The drawings and the description provided herein illustrate and describe various examples of the inventive methods, devices, and systems of the present disclosure. However, the methods, devices, and systems of the present disclosure are not limited to the specific embodiments as illustrated and described herein, and other examples and variations of the methods, devices, and systems of the present disclosure, as would be understood by one of ordinary skill in the art, are contemplated as being within the scope of the present application.

DETAILED DESCRIPTION

In general, techniques are described herein for inspection of films in order to determine the levels of transmission of light within a certain wavelength, or within a range or different ranges of wavelengths of light, through a film. As noted above, for certain applications of a film, the ability for a particular wavelength of light, or a range of wavelengths of light, to be transmitted through the thickness dimension of the film, (e.g., through a thickness dimension of a layer of the film), may be a critical quality factor tied to the required performance of the film.

For example, applications for certain films that are intended for use as a cover film on the exterior surface surrounding and/or covering display devices, such as computer monitors or displays of cellular phones, may be required to pass, at some minimum level of transmission, certain wavelengths of light, or certain ranges of wavelengths of light, while blocking or attenuating other wavelength(s) of light. In some applications, the film must be arranged to pass a particular wavelength of light, such as infrared light, with a minimum level of attenuation to that wavelength of light as the light passes through a thickness dimension of the film, while blocking the transmission of other wavelengths of light, such as light in the visible light spectrum. Use of films having particular light transmission characteristics may also be important in other application, such as automotive and industrial application, where the light transmission characteristics for the film may be required by one or more industrial standards and/or governmental regulations.

The measurement of light transmission levels, for example, with respect to infrared light transmission levels through a film, is currently restricted to small, discrete measures. Typically, making these measurements is very time consuming, may require specific sample sizes, and may not measure large portions (e.g., 100%) of the sample with respect to the relevant light transmission properties. In some applications where 100% inspection and measurement of the film is required, there may be no other way than these time-consuming techniques available to achieve the required quality control.

The systems, devices, and methods described herein provide techniques for measurement of light transmission properties of a film at high speeds (e.g., while a film is continuously moving through an inspection station), and which may include inspection of 100% of the film. This makes it suitable for implementation in online manufacturing applications where the invention can provide quality assurance along with real time feedback to the manufacturing process providing the film. Generally, the transmission of light through the film refers to the levels of transmission and/or attenuation of the wavelength(s) of light of interest relative to a thickness dimension of the film (e.g., light transmission between the top and bottom exterior planar surfaces of the film). This film may comprise a single layer of material, or may include multiple layers of different materials formed between the top and bottom exterior planar surfaces of the film. The thickness dimension of the film may be a dimension that is perpendicular (e.g., the length of a line extending at ninety-degrees between the top and bottom exterior planar surfaces of the film). Any reference to a "thickness dimension" of the film, however, is not necessarily limited to a dimension that is determined by a line that is exactly perpendicular to the top and bottom exterior planar surfaces of the film, and may include a dimension based on a length of a line that is non-perpendicular, for example, having an angular orientation relative to the top and bottom exterior planar surfaces of the film.

In some applications, a film is required to allow at least a minimum level of light transmission for a particular wavelength of light, such as infrared light, to pass through the layer(s) of the film across all portions of film that eventually are utilized in a final product, while attenuating or completely blocking transmission of other wavelengths or ranges of wavelengths of light, such as visible light, through the thickness dimension of the film. The portions of the film having these light transmission properties may include portions of a web that are to be converted to "parts" formed from pieces of the film that are separated from a larger web of the film.

The systems, devices, and techniques described herein allow measurement of light transmission levels, such as infrared light transmission levels, throughout a web comprising a film. Moreover, these measurements may be performed at a high rate of speed and over large areas, in some embodiments over the entirety of the expanse of material forming the web. According to the techniques described herein, measurements of the light transmission levels through the film may be made on a continuous basis as the film forming the web is advanced through an inspection station, also referred as an imaging apparatus. The imaging apparatus may comprise a light source arranged to transmit light, in some embodiments infrared light, toward a first side of the film forming a web as the web is being advanced along the web's length or down-web dimension past the light source. An image capturing device, such as a camera having a light sensor array, may be positioned at a location on a second side of the film opposite the first side of the film. The image capturing device is be configured to capture light that has been generated by the light source and transmitted through a thickness dimension of the film. The image capturing device generates electrical signals corresponding to the levels of the intensity of the light captured by the image capturing device for a plurality of imaged areas of the film. Processing circuitry, such image processing circuitry, is configured to receive electrical signals captured by the image capturing device and associated with levels of light transmitted through the thickness of the film material, and to process the electrical signals to generate data associated with the imaged portions of the web material with respect to the measured levels of light transmission passing through the film.

In addition, positional reader circuitry, which may include one or more sensors that are configured to determine positional data based on roll counters or position indicators, such as fiducial marks or barcodes read from the surface of the film, is used to correlate positional data associated with the imaged areas of the film to the captured light intensity values, thereby spatially synchronizing the captured light intensity values to specific, physical imaged areas of the film. In this way, the captured data associated with the measured levels of light transmission is mapped to the respective portions of the film using the positional data to generate a "roll map" of the web being imaged by the imaging apparatus. The roll map specifies a mapping of the measured light transmission levels over the various portions of the film to the position of the film where each of these measurements were made. The mapping can be performed by capturing the positional data, for example, by sensing fiducial markings provided along the length (down-web) dimension of the film, and as read by a reader device as the light transmission levels are being measured.

The captured positional data may be associated with the measurements of the levels of light transmission so that the measured levels of light transmission for the imaged portions of the web may be mapped to the position of the web where these measurements, respectively, were made. Using the measured levels of light transmission and the associated positional data, an overall mapping, or "roll map," for the light transmission levels over the portions of the web that were imaged by the imaging apparatus may be generated. In some embodiments, the imaged portions of the web include the entirety of the web across the cross-web dimension and along the entirety of the longitudinal axis (down-web dimension) of the web.

Using the roll map generated using any of the techniques described throughout this disclosure, or any equivalents thereof, various threshold levels for light transmission may be applied to the roll map to generate a pass/fail roll map. The pass/fail roll map may provide an indication, such as a graphical image, of the areas of the roll map that either pass the requirement(s) for a threshold level of light transmission, or fail the requirement(s) based on the threshold level applied to the roll map. The pass/fail roll map may further be provided to a conversion program that determines what areas of the pass/fail roll map may then be used to provide "good" parts that may be converted (e.g., separated into a part) from the web material and have all portions of the film that are to be included within the boundaries of the converted part meeting the required level(s) for light transmission.

FIG. 1 is a block diagram illustrating an overview of system 100 for manufacturing a film, and inspecting the film for light transmission characteristics in accordance with one or more exemplary implementations and techniques described in this disclosure. Initially, manufacturing process 110 receives various inputs 101 (e.g., material, energy, people, machinery), and applies manufacturing processes 110A, 110B, and 110C, to produce output 103 including film 112. Manufacturing process 110 is not limited to any particular type or form of manufacturing, and is illustrative of any type of manufacturing process operable to produce a film that can include transparent or semi-transparent films, that are intended to provide certain levels of light transmission characteristics for various wavelength(s) of light.

Film 112 provided by manufacturing process 110 may include a film having a nominal thickness dimension and a predetermined width dimension. A nominal thickness dimension of the film may be in a range from 25-500 micrometers, although not limited to this range of dimensions and may include film having a smaller or larger nominal thickness dimension. The predetermined width dimension may be in a range of twelve to sixty inches, although not limited to this range of width dimensions. The film can have a predetermined length, in most instances that can be many times longer than the width dimension, or can be provided from manufacturing process 110 in a continuous length, in either case which can be referred to as a web. In some embodiments, film 112 comprises a single layer of transparent or semi-transparent material, or may include a film having a plurality of layers of materials. The film may be intended to provide particular levels of light transmission, generally through the thickness dimension of the film, for a particular wavelength of light or for a range of wavelengths of light. The film may also be intended to attenuate or block the transmission of particular wavelengths or a range of wavelengths of light through the thickness dimension of the film. In some embodiments, the film is intended to allow a minimum level of transmission of light within a particular wavelength or a range of wavelength of light while also attenuating or completely blocking the transmission of a different wavelength of light, or a different range of wavelengths of light, through the thickness dimension of the film.

According to the techniques described herein, film 112 may be provided in a roll of web material having a fixed cross-web dimension and a predetermined or an indeterminant length dimension (down-web dimension). Each layer of film 112 may comprises a layer or a plurality of layers material forming a single layer of the film having a nominal thickness dimension between the generally planar top and bottom surfaces of the film.

System 100 may provide, as illustratively shown by arrow 105, film 112 produced by manufacturing process 110 to an inspection station including imaging apparatus 114. Imaging apparatus 114 may include a light source (not shown in FIG. 1) configured to generate and provide light at a particular wavelength, or over a range of wavelengths, that is/are of interest with respect to the levels of light transmission of these wavelength(s) through the film. The light source is arranged to provide the light in a direction so that the light is directed to be transmitted through a thickness dimension of the film. In some embodiments, the requirements for the film are associated with the film being able to block, either completely or at least with some level of attenuation, a particular wavelength or a range of wavelengths of light, while passing other wavelength(s) of light without any or with only a minimum level of attenuation.

Film 112 to be inspected by imaging apparatus 114 may be positioned so that the film is advanced adjacent to the light source so that the light generated by the light source is directed to a first surface (e.g., a bottom surface) of the film. The light from the light source may be transmitted through the film in a direction that is generally through (e.g., parallel to) the thickness dimension of the film, or at some angle that is non-parallel to the thickness dimension of the film, but wherein the light still travels through and exits a second surface, (e.g., a top surface substantially parallel to the bottom surface) of the film. An image capturing device configured to capture and measure light intensity levels (not shown in FIG. 1), such as a camera with an electrical image capturing array configured to capture and measure light intensity levels, may be positioned adjacent to the film on the second side (e.g., top surface) opposite the first side of the film were the light source is located. The image capturing device may be arranged to capture the light of one or a range of wavelengths of light that were transmitted through film 112 and received at the image capturing device, and to generated electrical signals corresponding to the measured levels of light received at the image capturing device. These electrical signals are then analyzed to determine the levels of intensity of the captured light for the pertinent wavelength or ranges of wavelengths of light, and used to further determine the levels of transmission of these wavelength(s) of light for each of the imaged areas of the film.

Imaging apparatus 114 may include devices configured to advance film 112 along a longitudinal axis of the film so that portions, such as a width-wise portion of the film, may be moved into and out of the imaging area formed between the light source and the image capturing device. As film 112 is advanced into and out of the imaging area, the levels of light transmitted from the light source that are also transmitted through the film and received at the image capturing device of imaging apparatus 114 are measured to capture image data associated with the levels of light transmission for the portion of the film being imaged by the image capturing device.

Imaging apparatus 114 further includes one or more devices (not specifically shown in FIG. 1) arranged to sense a positional marker, such as a fiducial mark or a bar code that may be printed on or incorporated within the film, the positional marker indicative of a physical position along a down-web dimension of the film. Based on sensing the positional marker, and in some embodiments, information read from sensing the positional marker, the measurements of the levels of light transmission through the film at each imaged areas of the film are spatially synchronized to the data obtained from the positional markers to provide data associating the imaged areas of the film to the corresponding physical position of the film where the light transmission levels were measured. The image data captured for each area of the film are mapped to the corresponding physical location of the web corresponding to the portion of the web where the imaging was performed based on the sensed positional marker data.

In some embodiments, the portion of film 112 being imaged at any particular instance in time extends across the entirety of film 112 in the cross-web dimension of the film. As film 112 is advanced, a plurality of portions of film 112 are advanced into, imaged, and advanced out of the imaging area of imaging apparatus 114 so that the portions of the film extending along the down-web dimension of the film may be measured for light transmission levels. The portions of the imaged areas may be contiguous, so that all portions of film 112 extending across the web in a cross-web dimension and along the down-web dimension of the film are measured for levels of light transmission.

As described above, imaging apparatus 114 also includes one or more devices configured to read and capture positional data associated the portions of film 112 that are being imaged by imaging apparatus 114 to measure the levels of light transmission through the film. For example, imaging apparatus 114 may include readers (not shown in FIG. 1), which are configured to read fiducial markings on a surface of the film, or markings that are embedded within the film. The fiducial marking may include information indicative of the position of the fiducial marking relative to the longitudinal dimension of the film. Imaging apparatus 114 may associate the captured positional data with the measured levels of light transmission for the imaged portions of the film to generate a "roll map" associated with the measured levels of light transmission measured for the various positions of the film that were imaged along and across the film. The data used to generate the roll map for film 112 may be used to generate one or more graphical images showing the various levels of light transmission as measured for one or more portions of the film.

In addition, various thresholds, such as light level transmission thresholds, may be applied to the data that was initially used to generate the roll map to further generate a pass/fail roll map. The pass/fail roll map may be used to generate a graphical image showing portions of film 112 that comply with and that do not comply with the levels of light transmission indicated by the thresholds applied to generate the pass/fail roll map. Additional details and description associated with an exemplary imaging apparatus are illustrated and described below with respect to FIG. 3.

Referring again to FIG. 1, imaging apparatus 114 may perform the analysis of the captured electronic signals associated with the measured levels of light transmission and/or the captured electronic signals associated with the positional data, and provide output 107 associating the positional data with the measured levels of light transmission for film 112. In some embodiments, this data may be forwarded as test results 116, and stored in database 122. In other embodiments, the electronic signals associated with the measured levels of light transmission and/or the electronic signals associated with the captured positional data may be forwarded as output 107 from imaging apparatus 114 to another computing device 120, such as a personal computer, for further processing by the computing device. Further processing of the signals received by computing device 120 may include use of the data to generate the roll map, to receive/retrieve input values for thresholds, and/or to generate additional data, such as a pass/fail roll map, associated with the imaging of film 112. The additional mapping and/or data may be provided as test results 116 and as an output from computing device 120, and/or may be stored as data in database 122.

Test results 116 are not limited to any particular form or type of test results. In some embodiments, test results 116 include one or more graphical images generated from data associated with the measurements of the levels of light transmission captured by imaging apparatus 114. The graphical image(s) may comprise an image, or stored data representative of the captured image, that can be displayed and viewed, for example, on a computer monitor of computing device 120 by operator 118, as illustratively shown by arrow 109. In some embodiments, test results 116 include graphical representations of a roll map illustrating information associated with the levels of light transmission for the imaged portions of film 112 associated with the physical positioning along and across the film from where the data was captured.

Graphical representations of the images captured from imaging portions of film 112 are not limited to any particular type of graphical representations. In some embodiments, graphical representations include two-dimensional graphs having X-Y axes and a graphical representation depicting variations in the levels of light transmission for particular wavelength(s) of light over some portions, or in some embodiments, over the entirety of film 112. Graphical information may include an indication of the value or values applied as threshold levels to a roll map to generate a graphical image of a pass/fail roll map. In various examples, test results 116 include information based on statistical analysis of the data associated with the captured images from imaging apparatus 114, either in tabular format, or in a graphical format such as a graph illustrating a bell curve or other statistical distributions of the captured image data.

In some embodiments, other information associated with imaging film 112 can be included in test results 116. For example, information related to which shift of manufacturing process 110 made film 112, a date and/or time associated with the manufacturing of film 112, what raw materials and/or machines were used in the production of the film, and what the environmental conditions were, such as ambient temperature of the area where and when the film was manufactured, are examples of information that can be associated with the particular film being inspected, and can be included in test results 116. The information included in test results 116 is not limited to any particular type of information, and can include any information or types of information deemed to be relevant to film 112 and/or imaging apparatus 114 associated with the measurement of light transmission properties of the film.

System 100 includes one or more devices operable to store any of the information described above, including test results 116, as data stored in database 122, or in any other type of system or device operable to store test results and any other associated information in a retrievable format. In some embodiments, database 122 is an electronic database, located either on-site where manufacturing process 110 is taking place, or may be a remote database coupled to test results 116 via a network, such as the internet, or through a local network. In some embodiments, database 122 may also represent, at least in part, printed materials stored in a location, such as a file room.

In addition to storing the information, system 100 may include one or more mechanism, illustratively shown as arrow 111, to allow feedback to be provided to manufacturing process 110 based on test results 116 and/or input provided by an operator (e.g., operator 118) that may be based on or derived from test results 116. In some embodiments, test results 116 may be provided on a real-time basis as imaging apparatus 114 is measuring light transmission levels for film 112 as the film is being provided from manufacturing process 110. Based on the test results and/or observations derived from the test results, feedback illustratively represented by arrow 111 may be provided to the manufacturing process 110, for example, to adjust one or more parameters of the inputs 101 or the parameters of manufacturing processes 110A, 110B, and/or 110C to alter the output being provide as film 112, in order to bring the output into compliance with one or more characteristics being measured and evaluated by the imaging of the film.

Figure 2:
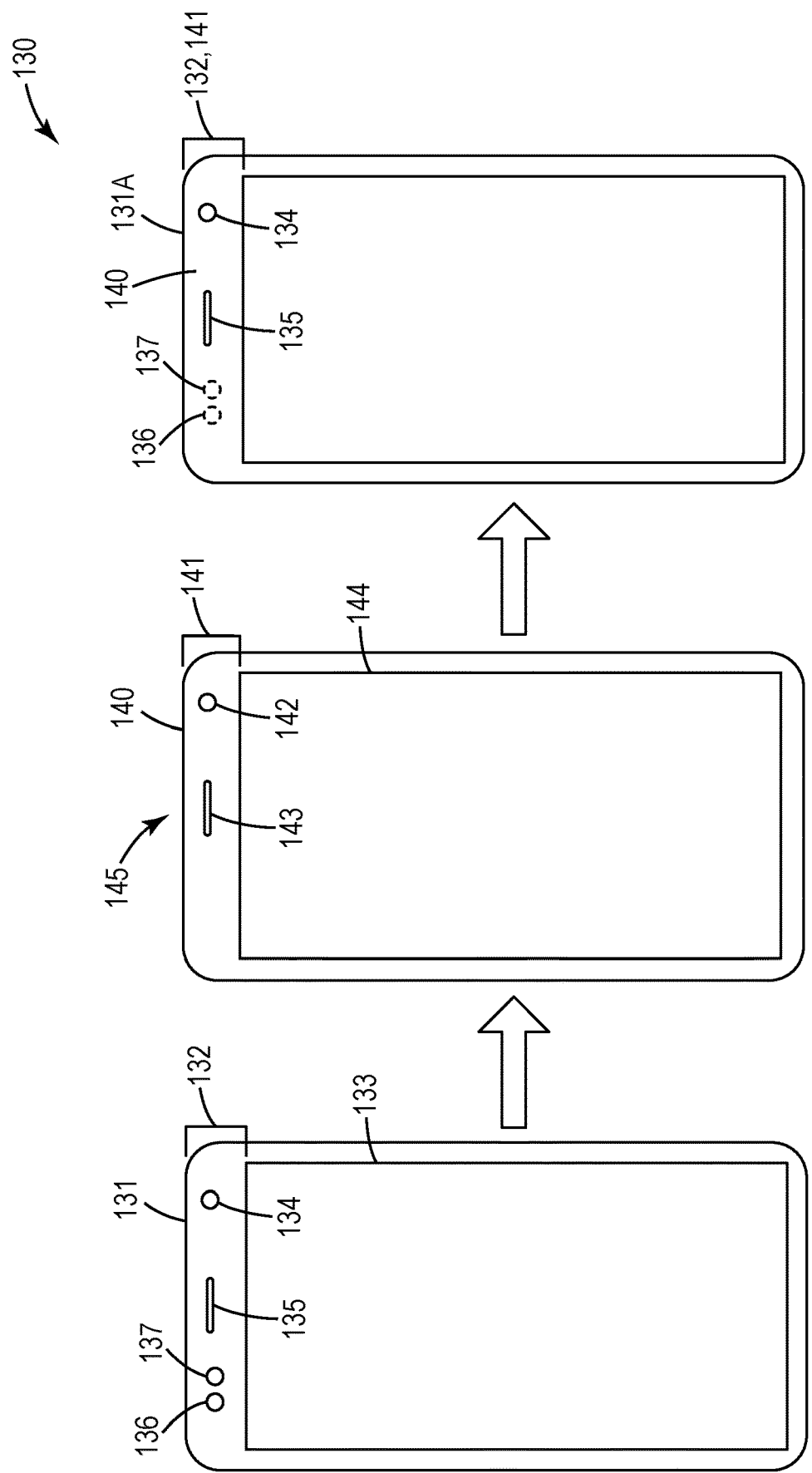
FIG. 2 is a diagram illustrative of use of part formed from a film having various requirements for light transmission characteristics.

FIG. 2 is diagram 130 illustrative of use of part 140 formed from film 145 having various requirements for light transmission characteristics. Diagram 130 includes an illustration of exemplary device 131 without the application of part 140 comprising film 145 having particular light transmission properties applied over portions of device 131, and further assembly 131A of device 131 having part 140 applied over portions of device 131. As shown in the left-hand portion of diagram 130, an exemplary device includes display screen 133 and header area 132 that boarders display screen 133 along a top edge of the display screen. Device 131 in some embodiments, is an electronic mobile device (e.g., a smart phone or a personal digital assistant). Display screen 133 may be any type of device configured to provide a visible display that may include graphical displays and/or text to a user who is viewing the display screen.

Header area 132 may include any of ON/OFF power button 134, electronic light sensing device 135, light signal transmission device 136, and light signal receiver device 137. ON/OFF power button 134 may be an actuatable device that may be actuated to turn device 131 on and off. Electronic light sensing device 135 may be used as a sensor for visible light, for example, in a camera function of device 131. Light signal transmission device 136 may generate and transmit a light signal, for example. using an infrared wavelength of light, and light signal receiver device 137 may be configured to receive back any portion of the light transmitted from light signal transmission device 136 and reflected back to device 131 from an object external to device 131.

The operation of light signal transmission device 136 and light sensing device 135 may be utilized by device 131, for example, as part of a range finding feature, and/or for use in a focusing function associated with the camera function of device 131. While the transmission of infrared light from light signal transmission device 136 and the reception of the light in the infrared wavelength may be important, it may be desirable, however, that these devices are not visible to a user looking at the portion of device 131 where these devices are located. In other words, in some embodiments, these devices should be hidden from view by a user observing display screen 133 of device 131.

In diagram 130, part 140 illustrates a part formed from a layer of film 145 is converted from a web of film that provides certain light transmission characteristics for particular wavelengths of light, or for particular ranges of wavelengths of light, through a thickness dimension of the film. For example, film 145 forming part 140 may allow infrared light to be transmitted through a thickness dimension of film 145 with little or no attenuation of the infrared light, while attenuating or completely blocking the transmission of light within the visible range of wavelengths of light. In the embodiment of film 145 used to form part 140, the wavelength of infrared light that is required to be transmitted through the film with no or some maximum level of attenuation may be light having a wavelength of 940 nanometers. In addition, the range of wavelength of visible light that are required to be attenuated when transmitted through film 145 forming part 140 may include light having a range of wavelengths from about 390 to 700 nanometers or a range of wavelengths of light that are defined in some settings as being visible to the typical human eye.

As shown in FIG. 2, part 140 includes openings 142, 143, and 144 extending through film 145. Opening 142 is shaped and arranged within header area 141 of part 140 to surround the power button 134 of assembly 131A when part 140 is placed over the front face of device 131, thus allowing access to power button 134 through part 140. Opening 144 is shaped and arranged within header area 141 of part 140 to surround electronic light sensing device 135 of assembly 131A when part 140 is placed over the front face of device 131, thus allowing light to pass through opening 143 and be received by electronic light sensing device 135. Opening 144 is shaped and arranged relative to header area 141 of part 140 to surround display screen 133 in assembly 131A, thus allowing light to pass through opening 144 and accommodate viewing of display screen 133 by a human user. Header portion 141 of part 140 is arranged to cover over the portion of header 132 of assembly 131A that includes the transmitter 136 and receiver 137 of assembly 131A when part 140 is place over the front face of device 131.

The right-hand portion of diagram 130 illustrates assembly 131A having part 140 installed over the front face of device 131. When installed onto device 131, opening 142 of part 140 allow access to power button 134, and opening 143 of part 140 allows for unattenuated transmission of light to and/or from electronic light sensing device 135. Opening 144 of part 140 further allows for unattenuated transmission of light to and from display screen 133 of device 131. Transmitter 136 and receiver 137 of device 131 are covered by header portion 141 of part 140 in assembly 131A. Because film 145 used to form part 140 blocks the transmission of visible wavelengths of light, transmitter 136 and receiver 137 are "hidden" from view by a user observing the header area of device 131, and as such transmitter 136 and receiver 137 are shown as dashed-line circles in the illustration of assembly 131A.

Further, because film 145 forming part 140 is arranged to transmit light in the infrared wavelength, the light signals transmitted from transmitter 136 may pass through header 141 of part 140 and be transmitted from assembly 131A. Any portion of the infrared light signal that may be reflected back to assembly 131A may pass through part 140 and be received by receiver 137 of assembly 131A. Thus, while hiding transmitter 136 and receiver 137 from view by a user, these devices can remain fully functional using the infrared wavelength of light they are configured to operated using. In order to operate properly, film 145 used to form part 140 may need to conform to various characteristics with respect to light transmission properties in both the infrared and the visible light spectrums. The devices, systems, and techniques described above with respect to FIG. 1 and as further described throughout this disclosure, may be used to inspect films for conformance to similar or other light transmission characteristics, either before or after the parts are converted from a web material comprise the film, to assure that at least the portions of the film that are used to form the parts used in a final application such as assembly 131A meet the required level(s) and criteria for light transmission properties required for the application in which the part is to be utilized.

Figure 3:
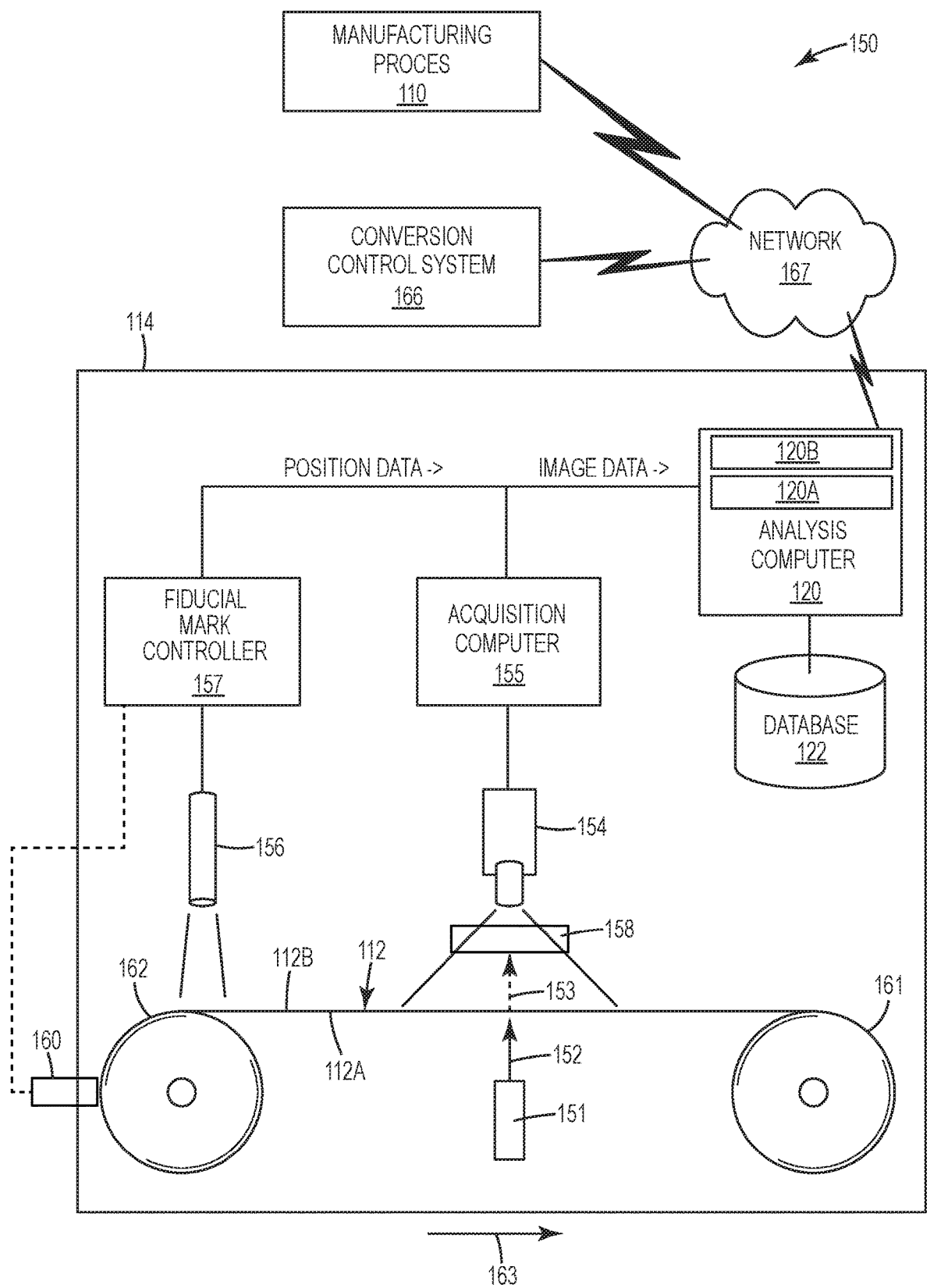
FIG. 3 is a functional block diagram of an exemplary imaging system for inspecting a web comprising a film in accordance with one or more exemplary implementations and techniques described in this disclosure.

FIG. 3 is a functional block diagram of exemplary inspection system 150 for inspecting a web comprising film 112 in accordance with one or more exemplary implementations and techniques described in this disclosure. Inspection system 150 includes imaging apparatus 114 arranged to inspect film 112 for light transmission properties as film 112 is continuously advanced past light source 151 positioned on one side of the film and image capturing device 154 positioned on a second side of the film opposite the light source. In the exemplary embodiment of inspection system 150, a segment of film 112 is positioned between two support rolls 161 and 162. Light source 151 is positioned between rolls 161, 162, and adjacent to film 112 on first side 112A of film 112 (e.g., adjacent to a bottom surface of the film). Light source 151 is arranged to generate a light having a particular wavelength, or light within a pre-defined range of wavelengths of light. Light source 151 is further arranged so that the light generated by light source 151 is incident on first side 112A of film 112, as illustratively indicated by arrow 152 in FIG. 3. Light source 151 is not limited to any particular type of light source, and may be any type of light source configured to generate and transmit light at an intensity and including a wavelength or a range of wavelengths of light that correspond to wavelength(s) of light that are of interest with respect to the light transmission properties of film 112. In some embodiments, light source 151 comprises a light emitting diode (LED), or a plurality of LEDs configured to generate and transmit light in the wavelength(s) of interest.

Depending on the light transmission characteristics of the portion of film 112 where light from light source 151 is incident on the film, all, some portion of, or none of the light provided by light source 151 will we transmitted through the thickness dimension of the film and exit second side 112B of the film, as illustratively represented in FIG. 3 by dashed arrow 153. The amount of light (e.g., light intensity level) from light source 151 that is transmitted through film 112 is in general a function of the light transmission properties of the film. Image capturing device 154 is arranged to capture any light transmitted through film 112 and exiting second surface 112B of the film in an area of the film opposite light source 151. Image capturing device 154 is positioned adjacent to film 112 and on second side 112B of the film opposite light source 151. Image capturing device 154 may be any device arranged to capture light generated by light source 151 and transmitted through film 112, and exiting from second surface 112B of the film, and to generated electronic signals corresponding to various properties of the captured light. For example, image capturing device 154 may be arranged to generate electrical signals indicative of the levels of light intensity of the light captured by the image capturing device that also corresponds to the wavelength or a range of wavelengths of light being generated by light source 151.

In some embodiments, light filter 158 is positioned between film 112 and image capturing device 154, the light filter arranged to filter light exiting the film, and in some embodiments, to block light from other sources, such as reflected light from the film, so that only light corresponding to a particular wavelength or a range of wavelengths of light that are of interest in the inspection of the light transmission properties of film 112 are allowed to pass through light filter 158. In doing so, light filter 158 may aid and/or reduce the amount of any error introduced into the measurement of the levels of light intensities being captured by image capturing device 154, for example, that might be caused by light that might otherwise be captured by image capturing device 154 but that was not generated by light source 151. In some embodiments, light filter 158 is arranged to allow passage of light of a particular wavelength of interest, while blocking the passage of other wavelength(s) of light that may also be generated by and transmitted from light source 151, but that are not of interest relative to the light transmission properties being measured for film 112. For example, light source 151 may be configured to generate light having various wavelengths including infrared wavelength(s) and wavelengths of light throughout the visible light spectrum. In some embodiments, only the transmission properties of film 112 related to a particular infrared wavelength of light is of interest, and light filter 158 may therefore be arranged to pass light having the infrared wavelength of interest while blocking other wavelengths of light, for example, light that fall within the visible light spectrum.

Image capturing device 154 may be positioned in close proximity to continuously moving film 112, with or without the use of light filter 158. Film 112 may be conveyed in a down-web direction generally indicated by arrow 163, and for example, by mechanical forces applied to rolls 161 and/or 162. The mechanical forces applied to rotate rolls 161 and/or 162, and thus advancing film 112, may be generated using, for example, electrical motors, or other means arranged to rotate rolls 161 and/or 162. As film 112 is advanced in the down-web direction, light source 151 provides light to first surface 112A of film 112, and image capturing device 154 scans sequential portions of the continuously moving film 112 to obtain image data. Image data may include sensing the level of the intensity of light reaching image capturing device 154 within the wavelength or a range of wavelengths of light of interest, and along an imaging area that extends across film 112 in a cross-web dimension of the film (e.g., along an axis of the film extending into and out of the drawing sheet as shown in FIG. 3). A computing device that includes processing circuitry (e.g., such as acquisition computer 155) may collect the image data from image capturing device 154, and perform further processing of the image data, such as determining a light transmission quantification value indicative of the levels of light transmission measured for each of the imaged portions of film 112.

Image capturing device 154 is not limited to any particular type of image capturing device, and may be a conventional imaging device that is capable of imaging sequential portions of film 112 as the film is advanced past the image capturing device, and providing outputs in the form of electronic signal, such as a digital data stream of image data. In some embodiments, image capturing device 154 is a line-scan camera. In other embodiments, image capturing device 154 is an area scan camera. As shown in FIG. 3, image capturing device 154 may be a camera that provides electrical output signals representative of sensed images of film 112 to acquisition computer 155.

In other embodiments, image capturing device 154 may provide a digital data stream and/or an analog signal representative of the images captured by the camera directly to computing device 120 for further processing by processing circuitry 120B included in computing device 120. Other sensors (e.g., laser scanners) may be utilized as imaging capturing device 154. A "sequential portion" of film 112 refers to data associated with imaging the film that is acquired by a succession of single line images. Single lines may comprise an area of the continuously moving film 112 that maps to a single row of sensor elements or pixels of image capturing device 154. Examples of devices suitable for acquiring the image include line-scan cameras such as those available under the trade designations "PIRANHA" from Dalsa, Waterloo, Ontario, Canada; or "MODEL AVIIVA SC2 CL" from Atmel, San Jose, Calif. Additional examples include laser scanners from Surface Inspection Systems GmbH, Munich, Germany, in conjunction with an analog to digital converter.

In additional to imaging the film to capture image data, examples of inspection system 150 include fiducial mark controller 157 arranged to control fiducial mark reader 156 to collect roll and position information from film 112. For example, fiducial mark reader 156 may include one or more photo-optic sensors for reading bar codes or other indicia from film 112. In the alternative or in addition, fiducial mark controller 157 may receive position signals from one or more high-precision encoders, illustratively shown as encoder 160 in FIG. 3, that may be engaged with film 112 and/or one or both of rolls 161, 162. Based on the position signals, fiducial mark controller 157 determines positional information for each detected fiducial mark read from film 112. Fiducial mark controller 157 communicates the roll and position information to computing device 120 as positional data. In some embodiments, processing circuitry 120B of computing device 120 is arranged to spatially synchronize the positional data with the corresponding image data so that the image data may be associated with the specific physical position along film 112 from which the image data was taken. Computing device 120 as shown in FIG. 3 may provide any of the features and perform any of the functions ascribed to computing device 120 illustrated and described with respect to FIG. 1.

Techniques for applying and using fiducial marks to identify specific locations on a web are described in U.S. Pat. No. 7,623,699 B2 (Floeder et al.), the entire contents of which are hereby incorporated by reference. Examples of various types of fiducial marks and techniques for reading the fiducial marks to perform spatial registration and combination of anomaly data are described in U.S. Pat. No. 7,542,821 B2 (Floeder et al.), the entire contents of which are hereby incorporated by reference. Techniques for using synchronization marks and roll synchronization signals provided by rolls handling a web to correlate positional data for anomalies and defects is described in U.S. Pat. No. 7,797,133 B2 (Floeder et al.), the entire contents of which are hereby incorporated by reference. Although discussed with respect to fiducial marks and fiducial mark controller 157 and reader 156, fiducial marks may not be necessary in all embodiments of the present disclosure to affect the techniques described herein. In other embodiments, other means may be used to determine physical locations of imaged portions of film 112, and other information on film 112 without departing from the techniques described herein.

Referring again to FIG. 3, processing circuitry 120B of computing device 120 processes image streams including image data provided from acquisition computer 155. Processing circuitry 120B may process the image data with one or more initial algorithms to generate a value, such as a light transmission quantification value, that is indicative of the level of light intensity measured by image capturing device 154 for one or more wavelengths of light at each of the portions of film 112 that were imaged by image capturing device 154. By way of example, the light transmission properties for film 112 with respect to transmission of infrared light having a wavelength of 940 nm through the thickness dimension of the film may be the property of the film that is being inspected for and measured by imaging apparatus 114. Light source 151 is therefore arranged to generate a light having a wavelength of 940 nm, and to direct the infrared light toward first side 112A of film 112.

The level of the light intensity passing through film 112 and exiting second surface 112B of the film is represented by dashed arrow 153, and is a function of the light transmission properties of the films at each portion of the film being imaged by image capturing device 154. These light transmission properties may be a function of the properties of film 112 itself, such as the arrangement of different layers of materials used to form the film, and in some instances, may also be affected by individual anomalies, such as surface defects or other anomalies in the film at particular locations along the dimensions of the film. These anomalies and/or defects may include spots, scratches, oil drips and/or machine line defects in the film.

Based on the position data produced by fiducial mark controller 157, processing circuitry 120B of computing device 120 determines the spatial position of each imaged area of film 112 at least with respect to the down-web dimension of the film. The image data provided by image capturing device 154 and/or acquisition computer 155 may include data the indicates the cross-web positioning of the image data relative to each imaged area of film 112. Based on the position data from fiducial mark controller 157 and the image data, processing circuitry 120B determines a light transmission quantification value indicative of the level of light intensity measured at each of the imaged areas of film 112, which is spatially synchronized to the specific physical position of the corresponding imaged area along the cross-web and the down-web dimensions of the film. For example, a coordinate system may be defined such that the x-dimension coordinate for an imaged area of the film represents a distance across the film in the cross-web dimension, and a y-dimension coordinate for the imaged area of the film represents a distance along a length of film 112 (e.g., along the down-web dimension of the film). These x and y coordinates may be used to generate a roll map, as further described below, that maps the measured levels of light intensity for the wavelength(s) of light of interest to the corresponding physical location along film 112 where the light intensity levels were measured using imaging apparatus 114.

Computing device 120 may record the image data, the positional data, any calculated light transmission quantification values, and any data associated with the generation of roll map(s) into database 122. The stored information may include the spatial location of each of the calculated light transmission quantification values with respect to the x-y coordinate system associated with film 112, or another set of data linking the light transmission quantification values to the corresponding physical positions along the cross-web and down-web dimensions of the film. Processing circuitry 120B of computing device 120 may also access this data stored in database 122 to generate additional data, such as a pass/fail roll map as further described below, based on the application of one or more threshold values to the light transmission quantification values calculated for the imaged portions of film 112. The threshold values may be initially entered by an operator, and may be stored in database 122 for later use in generating the pass/fail roll map, or for other types of analysis to be performed on the image data associated with the inspection of film 112. Any additional data, such as data associated with a pass/fail roll maps, may also be stored in database 122 for later retrieval and/or reference. In addition, the roll maps, including any pass/fail roll maps that may be generated by processing circuitry 120B may also be used to generate a roll map used to determine usable portions of film 112 for the conversion of a parts or a plurality of parts from the film, as further described below with respect to FIG. 4B.

Referring again to FIG. 3, any additional data, such as data associated with a pass/fail roll map, or usage roll maps associated with the conversion of part(s), may also be stored in database 122 for later retrieval and/or reference. Database 122 may be implemented in any of a number of different forms including a data storage file or one or more database management systems (DBMS) executing on one or more database servers. The database management systems may be, for example, a relational (RDBMS), hierarchical (HDBMS), multidimensional (MDBMS), object oriented (ODBMS or OODBMS) or object relational (ORDBMS) database management system. As one exemplary, database 122 is implemented as a relational database available under the trade designation "SQL SERVER" from Microsoft Corporation, Redmond, Wash. Database 122 as shown in FIG. 3 may be arranged to provide any of the features and perform any of the functions ascribed to database 122 as illustrated and described with respect to FIG. 1. Referring again to FIG. 3.

Referring again to FIG. 3, in some embodiments processing circuitry 120B of computing device 120 is configured to generated data, such as a roll map associated with the imaging of film 112, in real time, and to generate and display a graphical image in real time of the roll map on display device 120A, such as a computer monitor coupled to computing device 120. The graphical display may be observable by a human operator (e.g., as operator 118 as shown in FIG. 1).

Referring again to FIG. 3, computing device 120 may also be coupled to network 167 that may be coupled to one or more additional systems (e.g., manufacturing process 110 and/or conversion control system 166). Network 167 is not limited to any particular type of network, and may be any network, including the internet, a Local Area Network (LAN), a Wide Area Network (WAN) using any type of communication protocol that allows computing device 120 to communicate with manufacturing process 110 and/or conversion control system 166.

Communications occurring between computing device 120 and manufacturing process 110 may include real time communications, or communications delayed in time, and that correspond to the measurements and analysis of the measured and/or calculated light transmission properties of film 112. The data provided in these communications may be utilized by manufacturing process 110 to adjust one or more inputs and/or one or more parameters associated with the manufacturing of film 112, for example, to control, correct, and/or improve one or more properties of film 112 with respect to the light transmission properties of the film that is being produced by manufacturing process 110.

Communications occurring between computing device 120 and conversion control system 166 may include real time communications, or communications delayed in time, and that correspond to the measurements and analysis of the measured and/or calculated light transmission properties of film 112. These communications may be utilized by conversion control system 166 to control an automated conversion system that is converting (e.g., separating by cutting the film) the parts from film 112. Data, in some embodiments, including a roll map generated by computing device 120, may be communicated to conversion control system 166, the data indicative of which portions of film 112 comply with threshold levels of light transmission so that a part converted from these portions of the film will meet the light transmission property requirement(s) that may be applicable to the final product where the part of to be utilized.

For example, the information related to the mapping of light transmission quantification values for imaged portions of film 112 may be communicated by way of network 167 from computing device 120 to conversion control system 166. Based in this communicated information, conversion control system 166 may determine those portions of film 112 that may be converted into a part or parts having the required light transmission properties based on the light quantification values provided by computing device 120, or based on a pass/fail roll map provided by computing device 120. Once the data for film 112 has been mapped, the data may be used to mark parts on the web roll, either directly on the surface of the film, with a removable or washable mark, or virtually using the x,y coordinates, that may be converted from the film by conversion control system 166 and that will comply with the light transmission requirements for the part based on the determined light transmission quantification values for that portion of the film.

Examples of imaging film 112 may also include use of a polarization axis. Examples of image capturing device 154 may use a fixed linear polarizer mechanically attached to the image capturing device to define an axis to film 112 being inspected would also define a polarization axis. If the two axes are exactly aligned, then maximum light transmission would occur and the level of the light intensity measured by light capturing device 156 would be brightest. If these axes were exactly orthogonal, then level of light transmission through film 112 would be minimal. Other axis orientations would result in some transmission level between the two extremes, proportional to the relative angle of the two axes. Thus, the orientation of image capturing device 156 need not be perpendicular to the top surface of the film, wherein any angle of orientation other than perpendicular could be accounted for by the polarization axis. Exemplary embodiments may include two or more registered views with polarizers at different angles for imaging film 112. The additional views may increase the accuracy of the system. In some exemplary embodiments, the total number of registered views is three.

Figure 4A:
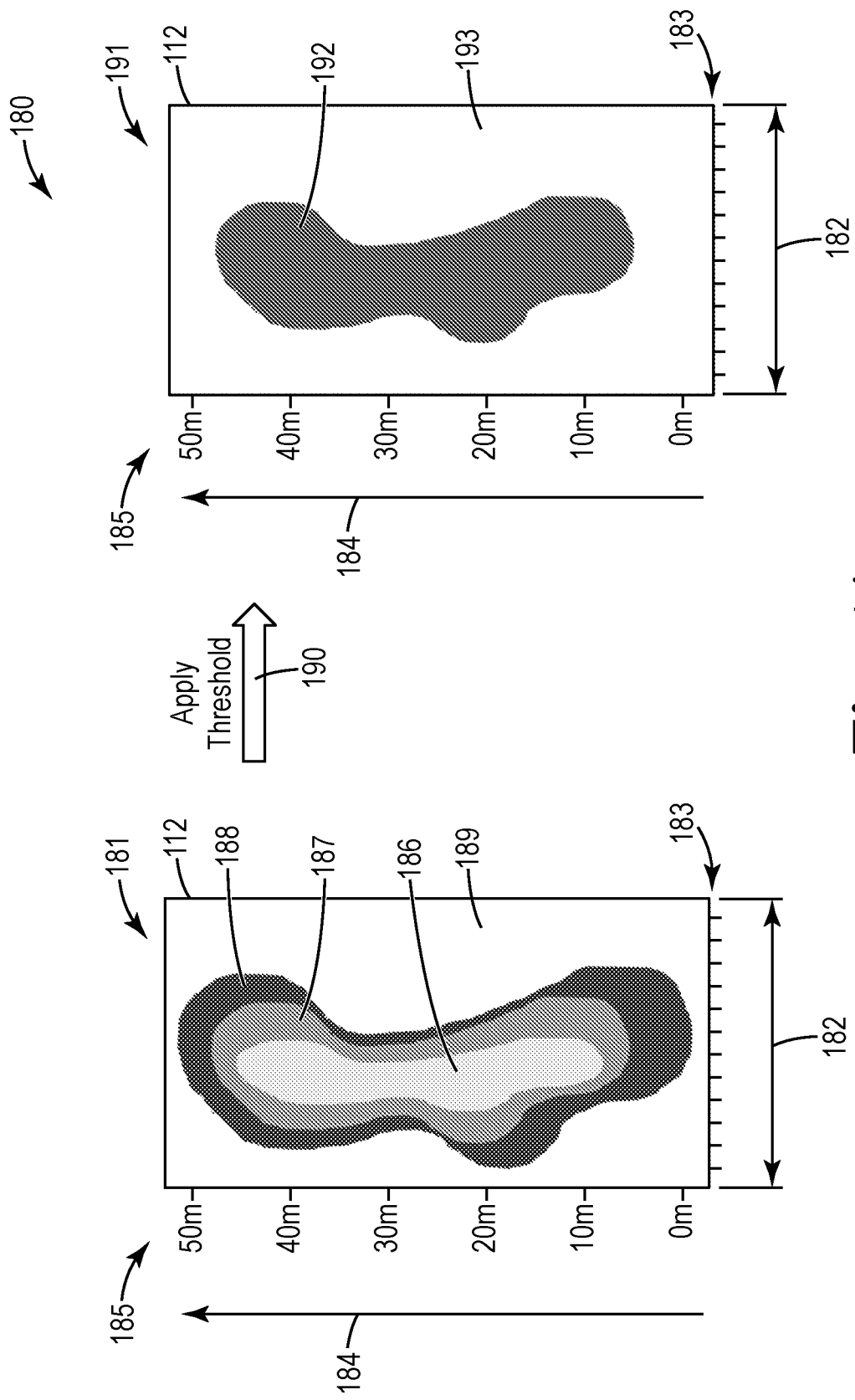
FIG. 4A is a conceptual diagram illustrating examples of mapping associated with levels of light transmission generated for a film in accordance with one or more exemplary implementations and techniques described in this disclosure.

FIG. 4A is conceptual diagram 180 illustrating exemplary roll maps 181, 191 associated with levels of light transmission generated for film 112 in accordance with one or more exemplary implementations and techniques described in this disclosure. In the example shown in FIG. 4A, the imaged portions of film 112 included in roll maps 181, 191 includes 100% of the area of the film represented by roll maps 181 and 191, respectively. Roll map 181 includes an exemplary mapping of the imaged portions of film 112 having areas of the film falling within predefined ranges for different measured levels of light transmission. Roll map 191 includes an exemplary mapping of portions of film 112 mapped onto the film and indicative of a pass/fail status assigned to the various portions of the film represented by roll map 191. Roll map 181 and roll map 191, including the measured values and positional information, may be stored as data structures within a computer-readable medium, such as a database, and may be used to generate a graphical representation indicative of the data measured and/or calculated from imaging film 112, for example, using light transmission inspection system 150 as illustrated and described with respect to FIG. 3. In this way, roll map 181 and roll map 191 may be representative of data that is stored in a database (e.g., database 122 as illustrated and described with respect to FIG. 1 and FIG. 3). Roll map 181 and roll map 191 may also be representative of actual graphical images that are rendered onto a display screen (e.g., display screen 120A of computing device 120 illustrated and described in FIG. 1 and FIG. 3) for viewing by a user (e.g., operator 118 as illustrated and described in FIG. 1). Operator 118 may interact with computing device 120, for example, to provide inputs to computing device 120, that are indicative of threshold values to be applied to generate roll map 181 and/or to generate roll map 191, as further described below.

Referring again to FIG. 4A, roll map 181 illustrates a portion of film 112 having overall width dimension 182, measured in some nominal units 183 of linear dimension, for example, in centimeters or inches. Overall width dimension 182 depicted by roll map 181 for film 112 is not limited to any particular width, and may be in some embodiments in a range from 12-36 inches. The width dimension, for example, of film 112 may be smaller or larger than these width dimensions. Roll map 181 also includes a length dimension, generally indicated by markings 185. The length dimension for film 112 may extend along a direction in which the film was manufactured and/or imaged when the levels of light transmission were measured for the film, such as a down-web dimension as generally indicated by arrow 184. As shown in FIG. 4A, the length dimension may or may not be depicted using markings 185 having a same unit of length as was used to depict the width measurement, and therefore the ratio of overall width dimension 182 may not be to scale with the length dimension of film 112 as depicted by roll map 181. In some embodiments, the length dimension of film 112 as represented by markings 185 may represent the entirety of the length dimension of film 112, and in other embodiments, the length dimension represented by markings 185 may only represent a portion of the overall length of film 112. In some embodiments, film 112 has an indeterminate length dimension, which may be hundreds of yards in length, all or only a portion of which may be represented by the portion of film 112 shown by roll map 181 in FIG. 4A.

As shown in FIG. 4A, roll map 181 includes a plurality of zones 186, 187, 188, and 189. The respective boundaries of the zones may be indicated by different types of lines, such as solid lines, long-dashed lines, and short-dashed lines, or lines otherwise distinguished, for example, by different shapes imposed on the boundary lines, such as squares, circles, and triangles. In some embodiments, different colors may be used to indicate the different areas of film 112 that comprise the different zones. In roll map 181, each zone 186, 187, 188, and 189 represents areas of film 112 that were measured to have a level of light transmission that was above, within, or below a particular threshold or a set of thresholds indicative of the measured levels of light intensity related to light transmission through a thickness dimension of the film.

For example, the area of film 112 indicated as zone 186 in roll map 181 may include only portions of the film where the percentage level of light transmission through the film was measured to be at least 65% (in some embodiments, in a range from 65 to 75%), relative to the level of the light intensity applied to the imaged area of the film by a light source and within a particular wavelength or a range of wavelengths of light. The area of the film indicated as enclosed by zone 187 (and excluding zone 186) may include only portions of the film where the percentage level of light transmission through the film was measured to be within a range from 55 to 65% relative to the level of the light intensity applied to the imaged area of the film by a light source and within the particular wavelength or the range of wavelengths of light of interest. The area of the film indicated as enclosed by zone 188 (and excluding zones 186 and 187) may include only portions of the film where the percentage level of light transmission through the film was measured to be in a range from 45-55% relative to the level of the light intensity applied to the imaged area of the film by a light source and within a particular wavelength or a range of wavelengths of light of interest. The areas of the film indicated as zone 189, generally the areas not included within any of zones 186, 187, and 188, may include only portions of the film where the percentage level of light transmission through the film was measured to be below 45% relative to the level of the light intensity applied to the imaged area of the film by a light source and within the particular wavelength or the range of wavelengths of light of interest.

As described above, zones 186, 187, 188, and 189 are indicated as areas of film 112 having a calculated percentage level for transmitted light intensity that falls above, within, or below one or more threshold levels relative to the level of the light intensity applied to the film by a light source used when measuring the level of light transmission for a particular wavelength or range of wavelengths of light in each of the imaged areas of the film. These percentage levels may represent an example of a metric, referred to as the light transmission quantification value, that was assigned to each of the imaged areas of film 112. The metric used for the light transmission quantification value is not limited to being calculated as a percentage value when generating the data depicted in roll map 181. In some embodiments, other values, such as a ratio value comparing the light level imposed by a light source on the film relative to the level of light measured for the light that was transmitted through film 112 in the area being imaged is used as the light transmission quantification value, and the calculated value for this metric is mapped to generate roll map 181. In addition, the light transmission quantification value may be a measurement of the optical density (e.g., absorbance) of the imaged area of the film for a single wavelength of light or for a combination of multiple wavelengths of light.

Other calculations for determining the light transmission quantification value may be used. For example, levels of light transmitted through the film in the imaged areas of the film may be measured using apparent intensity of the light relative to a gray scale. The applied exemplary gray scale may have a range of values from 0 (zero) to 255, with the light source applying the wavelength or wavelengths of light to be measured to the film having an exemplary gray scale intensity value of 200. The gray scale intensity value of 200 is correlated to a 100-percent level of light transmission. When imaging the film to measure the amount of the light provide by the light source that is actually passing though the film in the imaged area, the measured light intensities are converted to a gray scale intensity value relative to the value of 200 assigned to the light source. For example, if an imaged portion of the film being imaged transmits fifty percent of the light intensity provide by the light source at a wavelength (or within a range of wavelengths of light) being measured by the imaging device, that portion of the film would be assigned a gray scale value of "100," which is fifty-percent of the "200" gray scale value.

Calculations for determining the light transmission quantification values may include flat-field image correction techniques to remove pixel-to-pixel variations in the sensitivity of the light sensing array used by the image capturing device to measure light transmission as described through this disclosure. Flat-fielding is used to compensate for different levels of gain and dark currents in the pixels of the light sensing array. Gain may be defined as the amount of signal given by the light sensing array as a function of the amount (intensity) of light received. The dark current may be defined as the amount of signal given by the light sensing array when no light is incident on the light sensor array. These values may be determined for the light sensor array on a pixel-by-pixel basis. The pixel can be calibrated for these differences using the formula: Calibrated pixel=(raw pixel−dark pixel)/(reference pixel−dark pixel). The raw pixel represents the intensity of light measured by a pixel, the dark pixel is the dark current value for the pixel, and the reference pixel is a predefined pixel value used calibrate the light sensing array.

In other embodiments, actual measured values for the level of the light intensity, for example, actual measured lumen values, may be used as the light transmission quantification value for mapping the levels of light intensities depicted by roll map 181. Other units of measurement that may be utilized to compare the actual and/or relative levels of light intensities measured for the imaged areas of film 112 may be utilized to provide data for generation of roll map 181, and are contemplated for use as techniques that may be used to generate the depiction of roll map 181.

The values used to determine the levels of light transmission for film 112 for each imaged area of film 112 may be mapped relative to the two-dimensional positioning (e.g., the cross-web and down-web dimensions), across the surface of film 112, as depicted by roll map 181. In some embodiments, the physical position of each imaged area of film 112 relative to a longitudinal dimension of the film may be determined by reading positional markings, depicted as markings 185, which may also be referred to as positional indication markings or fiducial marking, provided as printed markings on or within film 112. These positional indication marking may take different forms, such as bar code marking and/or fiducial references, that provide a unique and/or relative identification of the longitudinal position along the down-web dimension of the film. In some embodiments, the imaging device performing the imaging of film 112 generates an image area that extends across the entirety of the cross-web dimension of the film, and that imaged area extending across the cross-web dimension of film 112 is spatially synchronized with longitudinal positional data that is indicative of the longitudinal position of the imaged area relative to the down-web position of the image area along the length dimension of the film.

As part of generating the image data associated with imaging a particular image area, the image capturing device used to image the film may also generate the width-wise positional information required to associate a given imaged portion of film 112 with a corresponding physical positioning relative to the cross-web dimension of film 112. For example, an imaged area of the film may correspond to a single pixel or other individual element that the image capturing device being used to image film 112 is capable of generating as an individual electronic signal. In such embodiments, each individual pixel or element will have a level of light intensity for a wavelength or a range of wavelengths of light measured and associated with that particular pixel or element. The resulting calculated light transmission quantification value calculated for that pixel or element will be mapped into roll map 181 based on the relative cross-web position of the pixel or element, which may be indicated as part of the image data provided by the image capturing device when the imaging of the film at the cross-web location of the film associated with the pixel or element was taken. The associated down-web location of the pixel or element may be determined using the positional data sensed and/or provided by fiducial mark controller 157 illustrated and described with respect to FIG. 3. In other embodiments, the imaged areas of film 112 are assigned a particular light transmission quantification value and mapped to roll map 181 as illustrated in FIG. 4A, may include a group of two or more pixels or elements of the light sensing array, such as a group of pixels or elements arranged in a line having an orientation that corresponds to a cross-web dimension of film 112.

Using one or more of these mapping techniques, roll map 181 provides a mapping of the measured levels of light transmission for each of the imaged areas of film 112 to the corresponding physical position (e.g., the width and longitudinal dimensions) of the imaged areas of the film, for example, using a two-dimensional grid system based on width dimension 182 and the length dimension (down-web dimension illustratively represented by arrow 184) the film.

Once the light transmission measurement data has been collected for the film, various parameters and/or threshold values used for the mapping, for example, the setting of percentage range(s) for one or more zones to be mapped, and a mapping such as roll map 181 may be generated and/or regenerated to reflect the latest set of mapping parameters. The ability to generate and regenerate roll map 181 based on adjustable sets of threshold values allows flexibility in the manner the data is mapped and/or graphically depicted, for example, for display to a system user. For example, a different threshold or different sets of thresholds may be applied to a same set of image data measured from film 112 to provide a graphical indication of which portions of the film would be in conformance with different sets of performance criteria related to light transmission properties.

In addition to the mapping of the light transmission levels as depicted by roll map 181, additional mapping parameters may be applied to the data associated with the measured levels of light transmission used to initially generate roll map 181. For example, a pass/fail threshold level, such as a percentage level, may be applied to the mapping process to generate a new pass/fail roll map 191 that indicates which portions of the film would "pass" and which portions of the film would "fail" based on the pass/fail threshold level. The pass/fail threshold level may be set at a level that is determined by a quality control parameter, such as a customer or a regulatory requirement, related to a required minimum level of light transmission for a particular wavelength or a range of wavelengths of light that are required for the application where the film being mapped is potentially to be utilized.

In the illustration of pass/fail roll map 191, zone 192 is bounded within the portion of film 112 included within roll map 191. Another zone 193 surrounds zone 192, and includes the portions of film 112 included in pass/fail roll map 191, but not included within zone 193. These portions of film 112 that are indicated as being within zone 192 and the remaining portions indicated as be included with zone 193 may be determined based on a status indication value assigned to each of the imaged areas of film 112. In some embodiments, the status indication illustrated in roll map 191 may have two possible values, indicated by a "pass" value or a "fail" value, which may be referred to as the status indication value, and for which one of the two possible values is assigned to each of the imaged areas of the film. Pass/fail roll map 191 may be a graphical image generated based on a mapping of these status indication values for each of the imaged areas of the film relative to the corresponding physical position of each of these imaged areas.

By way of example, a pass/fail threshold level may be determined to be at least a certain percentage (minimum level) of measured light transmission for a particular wavelength of light, (e.g., infrared light having a 940 nanometer wavelength), for any portions of the film intended to be used in a particular application. Application of a pass/fail threshold, illustratively represented by arrow 190, may be applied to the data associated with roll map 181 to generate a new pass/fail roll map 191. As shown in pass/fail roll map 191, the areas of film 112 included within zone 192 pass the requirement for a minimum level of light transmission based on the applied pass/fail threshold 190. Portions of film 112 within zone 192 could be removed or converted into one or more smaller sections of film (e.g., "part" or "parts"), and utilized for the application requiring the threshold level for light transmission. The areas of film 112 not included within zone 192, indicated generally as zone 193, fail the requirement for the minimum level of light transmission based on the applied pass/fail threshold 190. These portions of film 112 would not be considered usable for the particular application of the film requiring the threshold level of light transmission dictated by threshold 190. As such, pass/fail roll map 191 can be used to determine which areas of film 112 could be used to provide a part or parts that, when converted from film 112, would meet the requirements related to light transmission level(s) for the defined wavelength(s) of light set by the value of threshold 190.

By virtue of the ability to generate a mapping such as pass/fail roll map 191, portions of film 112 that could be utilized in a given application having a particular light transmission requirement may be located with respect to the cross-web and down-web positioning along the film, and thus separated from the other (failing) portions of the film. This capability may allow use of portions of a film having some portions of the film that may not be suitable for the particular application. In other words, the entire roll of web material does not necessarily have to be compliant, and thus does not necessarily need to be rejected, for use of the film in that roll of material for a particular application. In addition, the ability to set and test different levels for the pass/fail threshold may allow a user to determine what other application(s) a particular batch of film may or may not be usable for while meeting the requirements with respect to light transmission properties for these different applications. These features may improve efficiency and reduce waste by allowing operators to determine which portions of a film may be used, and for what application(s) the film may be qualified to be used for, when considering the film as a whole, for example, an entire roll of film, and/or when considering which portions of the film may be used for one or more different application, for example, when converted into parts using an automated conversion system and based on the roll mapping of the film.

Further, information derived from the mapping of the light transmission properties of film 112 may be analyzed and used as feedback to troubleshoot and/or correct conditions and/or parameters of the manufacturing process(es) that were used to produce film 112. For example, the patterns, such as lines of "failed" portions of film 112 extending in the down-web dimension that appear in the roll map 181 and/or pass/fail roll map 191 may be used to located devices, such as rollers being used to handle the web during the manufacturing process, that may be contributing to problems with the light transmission properties of the film. Based on the information provided by the roll mappings, these issues may be located and resolved at the manufacturing level, and thus increasing the usable portions of later manufactured films, thus increasing yield and reducing waste.

Although the embodiments described above with respect to roll maps 181 and 191 have been described with respect to the measured/calculated levels of light transmission for film 112, a similar mapping and graphical illustration may be generated based on the attenuation levels for particular wavelength(s) of light transmitted through the film. For example, using the measured level of light intensities having a particular wavelength or range of wavelengths that were transmitted through the imaged portions of film 112, a value for the level of attenuation of the light in these wavelengths caused by the light passing through the film may also be calculated. For example, if the measured intensity level of light in the wavelength(s) of interest that was transmitted through the film in a particular imaged area of the film was 70 percent, an attenuation value of 100 percent minus 70 percent, or 30 percent, can be assigned as a light attenuation value for the imaged portion of the film.

In some applications, the desired light transmission properties of the film may be such that the film is required to attenuate light within the wavelength(s) of interest by at least a minimum amount, as opposed to allowing transmission of the same wavelength of light through the film with no more than a minimum level of attenuation. As such, attenuation values for a minimum level of attenuation of the light having a particular wavelength or a range of wavelengths of interest may be mapped to physical locations along a film, for example, similar to the graphical illustration provided as roll map 181, in order to generate a pass/fail roll map in a similar manner used to generate pass/fail roll map 191, but having the graphical indications indicative of the attenuation levels for the film. These attenuation mappings may be applied in any of the techniques described above, for example, with respect to determining a status for a roll of the film in its entirety or a status each portion of the film, to provide feedback to the manufacturing process(es) producing the film, and to provide inputs to a conversion system to control conversion of parts from the film based on the attenuation mapping.

Figure 4B:
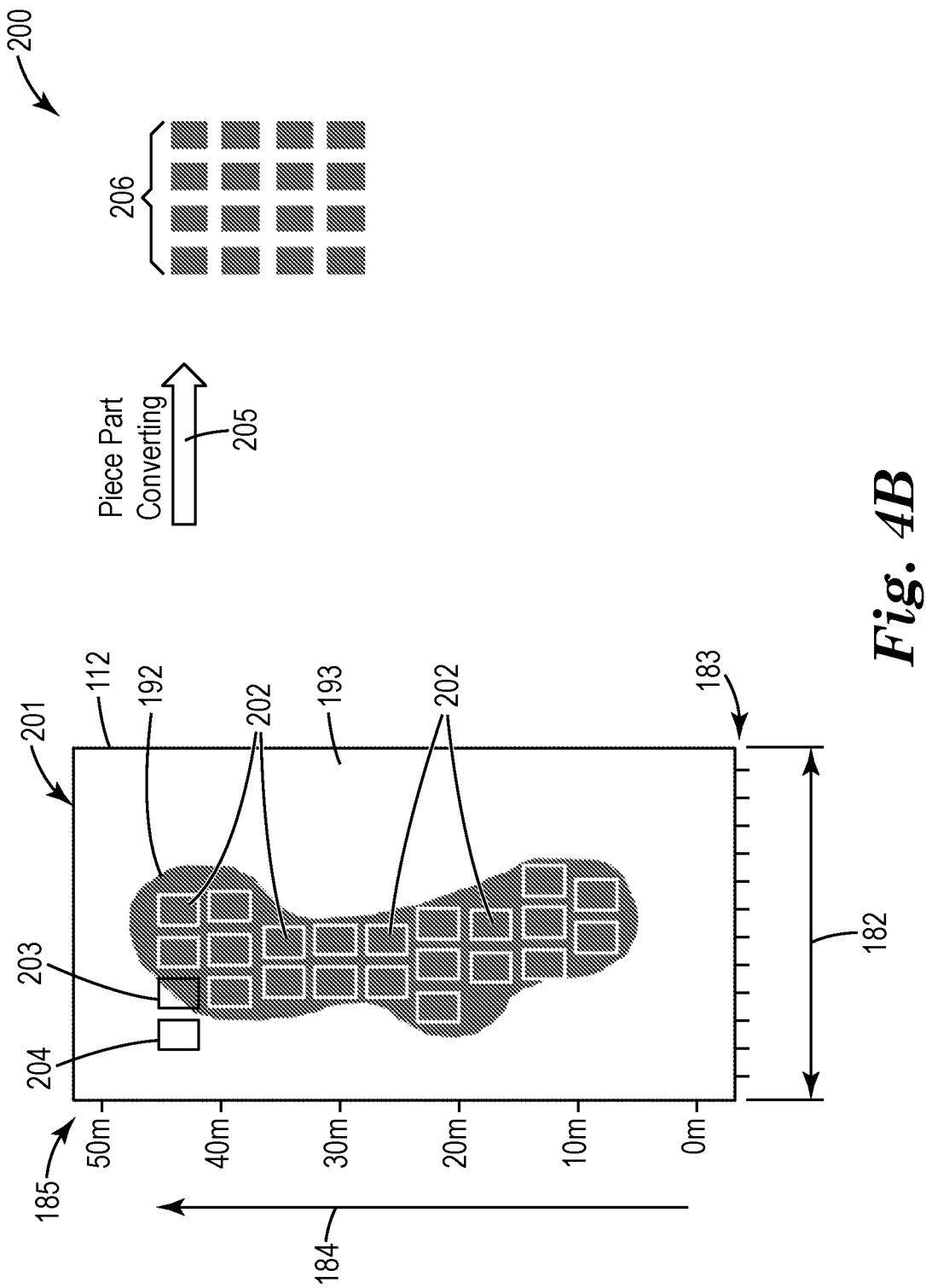
FIG. 4B is a conceptual diagram illustrating use of a roll map to determine usable portions of a film for generating parts in accordance with one or more exemplary implementations and techniques described in this disclosure.

FIG. 4B is conceptual diagram 200 illustrating use of roll map 201 to determine usable portions of film 112 for generating parts 206 in accordance with one or more exemplary implementations and techniques described in this disclosure. Roll map 201 includes film 112 with a mapping illustrated as zone 192. Zone 192 includes portions of film 112 having a level of light transmission assigned a "pass" value as the status indication value for that portion of the film. Roll map 201 also illustrates portions of film 112, generally indicated as zone 193, having a level of light transmission assigned a "fail" value as the status indication value for that portion of the film. As further illustrated by roll map 201, a plurality of parts 202, 203, 204 are illustrated as superimposed onto the roll map 201. Parts 202, 203, and 204 are illustrated as examples of a portion of film 112 that may be converted (e.g., cut away and/or separated) from the film, and having the required width and length dimensions for a part to be converted from the film. Although parts 202, 203, and 204 are illustrated as each having a rectangular shape, parts that may be mapped using examples of roll map 201 are not limited to parts having any particular shape and/or any particular dimensions, and other shaped parts, for example, parts having circular, square, elliptical, or irregular shapes may also be depicted as images that may be superimposed onto roll map 201. Parts having different shapes relative to one another may be depicted on the same exemplary roll map 201, and are contemplated as examples of roll map 201.

As shown in FIG. 4B, each of parts 202 are positioned on roll map 201 so that entirety of the width and length dimensions of a given one of parts 202 fits within zone 192. As such, a part having the dimensions illustrated by parts 202 and converted from the portion of the film indicated as zone 192 will provide the required minimum level of light transmission for the part's intended use as set by the pass/fail threshold and as indicated by the depiction of zone 192. A plurality of parts having the dimensions of parts 202 and meeting the minimum level requirement for light transmission, and that may be converted from film 112, as represented by "piece part converting" arrow 205, and are illustrated by the parts 206 indicated by the bracket in FIG. 4B.

As also illustrated in FIG. 4B, a part 203 having the proper dimensions corresponding to parts 202 may be illustratively positioned within roll map 201 so that only a portion of part 203 is within zone 192, and the additional portion of part 203 falls outside zone 192 and within zone 193. Because part 203 is not positioned entirely within zone 192 (the "pass" zone), a part converted from the film depicted by part 203 would not necessarily be a part that would meet the required minimum level of light transmission across the entirety of the part, and therefore may be a "reject" part if converted from the portion of film 112 where part 203 is positioned. Similarly, part 204 having the proper dimensions corresponding to parts 202 may be illustratively positioned within roll map 201, but having no portion of part 204 positioned within zone 192. Because part 204 has no portion of the part positioned within zone 192 (the "pass" zone), a part converted from the film depicted by part 204 would not necessarily be a part the would meet the required minimum level of light transmission across any portion of the part, and therefore may be a "reject" part if converted from the portion of film 112 where part 204 is positioned.

The ability to superimpose images of proposed parts onto a mapping of the levels of light transmission such as roll map 201 may provide several benefits. For example, a portion of a film may be analyzed to determine a potential yield rate (e.g., a number of parts 206) that may be converted from the mapped portion of the film. The mapping also illustrates with portions of film 112, such as along the sides of the film, generally do not provide "pass" status values. Such information may be utilized to troubleshoot the manufacturing process used to produce the film in order reduce the "fail" areas of the film, and thus increase the overall yield of part that may be converted from the film. Further, in some embodiments, one or more user inputs may be available that allow manipulation of the positioning of the proposed parts in the map, and thus to further maximize the potential yield of qualifying parts from the film. For example, the positioning of parts 202 to the right of part 203 in roll map 201 may be adjusted to allow movement of part 203 so that part 203 is positioned within zone 192 and thus would represent a "good" part if converted from the film in the new position.

In addition, remapping of the area included within zone 192 may be performed based on inputs that, for example, adjust the level set for the pass/fail threshold used to determine the areas that should be included within zone 192. For example, the pass/fail threshold may be set to a different threshold level, such as a higher or a lower threshold level, and roll map 201 may be remapped to define any changes in the boundaries of zone 192 based on the new threshold level(s). The data associated with roll map 201 may be used to determine whether changes in the levels of yield may be obtained from a given portion of film 112, such as the portion of film 112 depicted in roll map 201, for various setting of the applied threshold levels. In addition, the data associated with the generation of roll map 201 may be provided, for example, electronically accessed, by a conversion control system (e.g., conversion control system 166 of FIG. 3). Access to the data used to generate roll map 201 may allow the automatic control by the conversion control system in the conversion of parts from the film. The conversion control system may use the data from roll map 201 to automatically convert parts only from the portion(s) of the film where the part can be positioned entirely within the "pass" zone 192, thus assuring that the portion of film 112 used in these parts complies with the light transmission requirements set by the threshold level setting used to generate the roll map.

Figure 5:
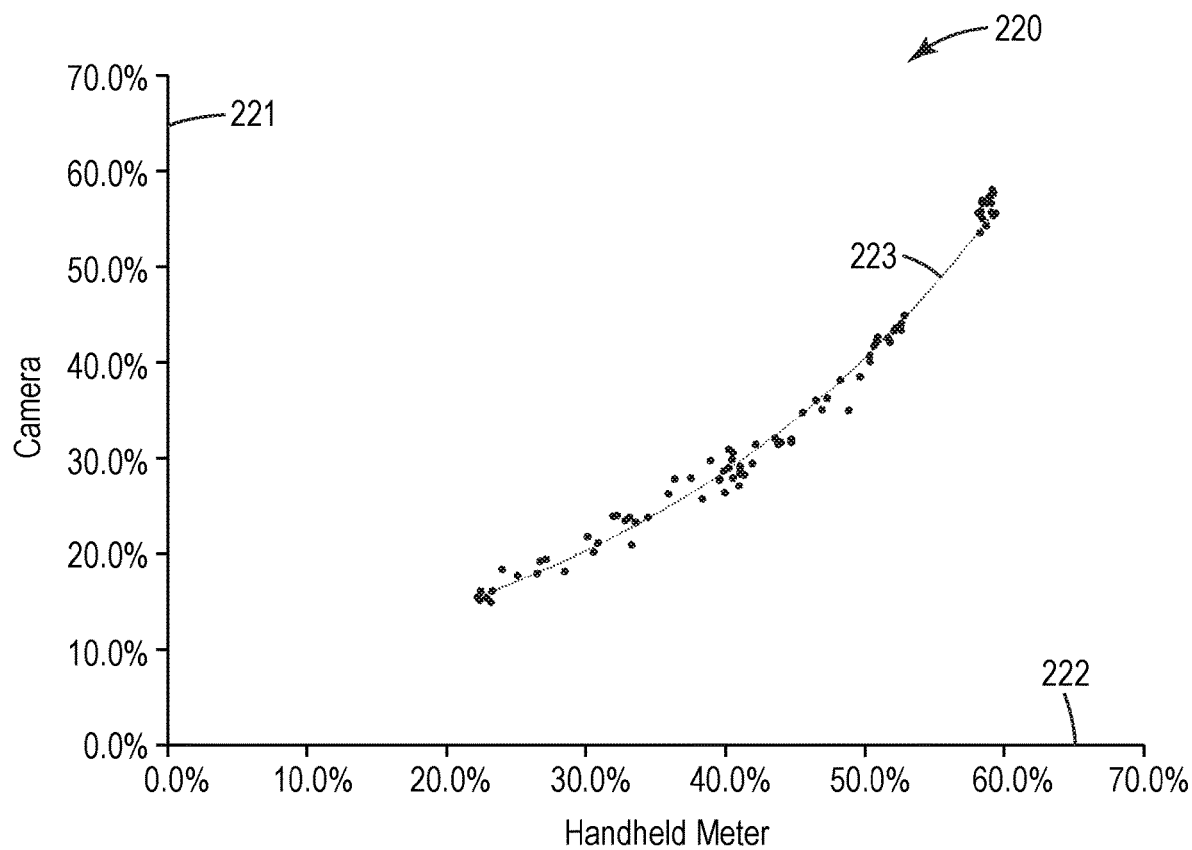
FIG. 5 illustrates a graphical diagram of test results for measured levels of light transmissions through a film in accordance with one or more exemplary implementations and techniques described in this disclosure.

FIG. 5 illustrates a graphical diagram 220 of test results for measured levels of light transmissions through a film in accordance with one or more exemplary implementations and techniques described in this disclosure. Graphical diagram 220 includes a horizontal axis (x-axis) 222 representative of measured values for light intensity that were measured using a hand-held infrared light meter. Graphical diagram 220 further includes a vertical axis (y-axis) 221 representative of measured values for light intensity that were measured using a camera including a light sensing array element. As illustrated by curved line 223, there is a strong correlation between the intensity values measured by the hand-held meter and as measured for the same light intensity levels when measured using the camera. The results of the correlation of the data may be used as a calibration tool to further enhance the accuracy of the camera measurement system and the measurements captured by the camera used to generate the data plotted relative the vertical axis 221 in diagram 220.

Figure 6:
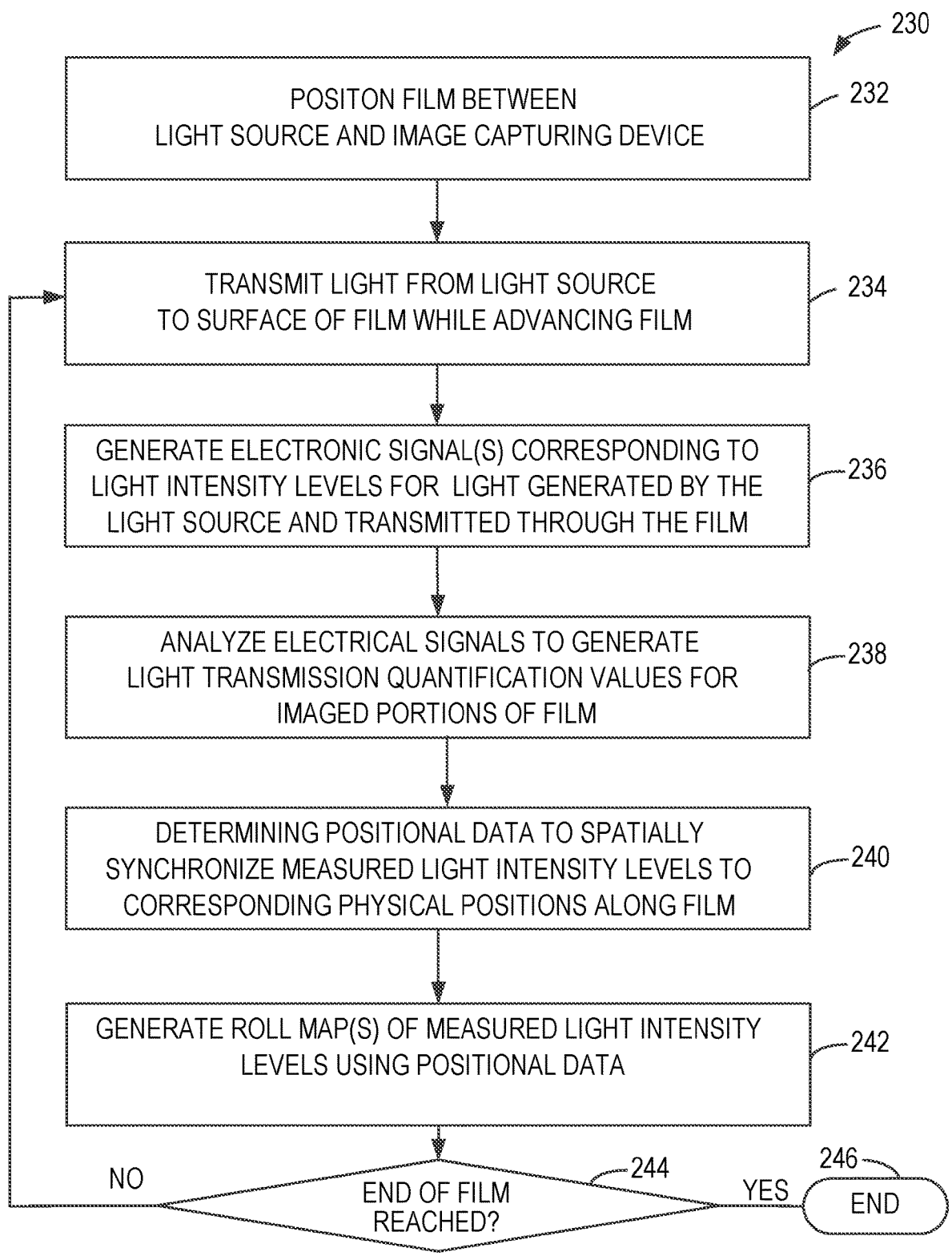
FIG. 6 is a flowchart illustrating an exemplary method for light transmission measurement in accordance with various techniques described in this disclosure.

FIG. 6 is a flowchart illustrating exemplary method 230 for light transmission measurement in accordance with various techniques described in this disclosure. Although method 230 is described as being performed by inspection system 150 as illustrated and described with respect to FIG. 3, execution of one or more steps of method 230 are not limited to being performed by the specific devices described with respect to inspection system 150, and may be performed, in part or in their entirety, by other devices arranged to perform the operations and to provide the features associated with performance of method 230.

Referring again to FIG. 6, method 230 includes positioning film 112 between light source 151 and image capturing device 154 of imaging apparatus 114 (block 232). Light source 151 may be configured to generate light have a particular wavelength or a particular range of wavelengths, and at a pre-defined level of light intensity. Image capturing device 154 may be any device configured to measure levels of light intensity at least within the range of wavelength(s) of light of interest with respect to measurement of the light transmission properties of film 112. As part of positioning the light source and the image capturing device, light source 151 may be calibrated to generate light having a particular level of intensity at one or more wavelengths of light of interest, and image capturing device 154 may be calibrated to measure levels of intensity of light transmitted through a thickness dimension of the film relative to the calibrated light level being generated by the light source. In various examples, positioning of film 112 between light source 151 and image capturing device 154 may include positioning light filter 158 between the film and the image capturing device, the light filter configured to pass one or more wavelengths of light, and to block other wavelengths of light so that only the wavelengths of light that are allowed to pass through light filter 158 are transmitted from film 112 to image capturing device 154. In some embodiments, film 112 positioned between the light source and the image capturing device is a film that is intended to have pre-defined light transmission properties for light having the wavelength(s) of interest being transited through a thickness dimension of the film.

Method 230 includes transmitting light from light source 151 to a surface of film 112 while advancing the film (block 234). Advancing the film may include applying a mechanical force, such as a rotational force, to one or more devices, such as rolls, that are engaged with film 112 and arranged to advance film 112 past light source 151 and image capturing device 154 at some pre-determined and controllable rate.

Method 230 includes generating, by image capturing device 154, electronic signals corresponding to the variations in the sensed levels of light intensities of the light generated by the light source and transmitted through a thickness dimension of film 112 (block 236). Generating the electronic signals may include capturing a measurement of the level of light intensity for each pixel or element of a light sensor array of the image capturing device associated with an imaged area of the film as the film is advanced past the image capturing device.

Method 230 includes analyzing the electrical signals corresponding to the variations in the sensed levels of light intensities of the light to generate light transmission quantification values for each of the imaged portions of the film (block 238). The light transmission quantification values in some embodiments are calculated as percentages relative to the light intensity level provided by the light source, as a ratio of the light intensity level of light provided by the light source, as a gray scale value, or as actual value of the measured level of light intensity, such as in lumens.

Method 230 includes determining positional data used to spatially synchronize the measured light intensity levels to corresponding physical positions on the film (block 240). Positional data may be generated by reading fiducial marks using fiducial mark reader 156 coupled to fiducial mark controller 157. The fiducial marks may be provided along a longitudinal dimension of the film (e.g., bar codes marking printed on a surface of the film, or fiducial marks otherwise incorporated into the film). Positional data may also be generated, either alone or in combination with sensing fiducial marking along the film, by sensor signals provided by one or more encoders engaged with the mechanisms that are being utilized to advance the film past the image capturing device.

Method 230 includes generating one or more roll maps of the measured levels of light intensities transmitted through the thickness dimension of the film for each of the imaged areas of the film using the positional data (block 242). In some embodiments, the imaged areas of the film correspond to an area the can be imaged by a single pixel or a single imaging element of a light sensor array of the image capturing devices. In some embodiments, the imaged areas of the film include 100 percent of the areas of the film in both the cross-web and the down-web dimension of the film. In some embodiments, the mapping of the imaged areas of the film is provided in real-time. The mapping may be provided as a graphical image depicting a roll map that is displayed on a display device, such as a computer monitor.

The roll map(s) provided by method 230 may include any of the roll maps described throughout this disclosure, including a roll map depicting zones having light transmission quantification values that fall below, within, and/or above various threshold values. The roll map(s) provided by method 230 may include a pass/fail roll map that includes indications of zones along the cross-web and the down-web dimensions of the film that comply with and that do not comply with, respectively, a pass/fail threshold value for light transmission through a thickness dimension of the film. The roll map(s) provided by method 230 may include a graphical depiction of a plurality of parts superimposed onto a pass/fail roll map, the mapping indicative of which and/or how many parts may be fitted into the zone or zones of the map that would be considered areas of the film that "pass" the light transmission requirements for the parts based on the pass/fail threshold value used to generate the roll map.

Method 230 includes determining if the end of the film has been reached as the film is advanced past the light source and the image capturing device (decision block 244). If the end of the film has not be reached (the "NO" branch for decision block 244), method 230 returns to block 234. If the end of the film has been reached (the "YES" branch exiting the decision block 244), method 230 ends (block 246).

Figure 7:
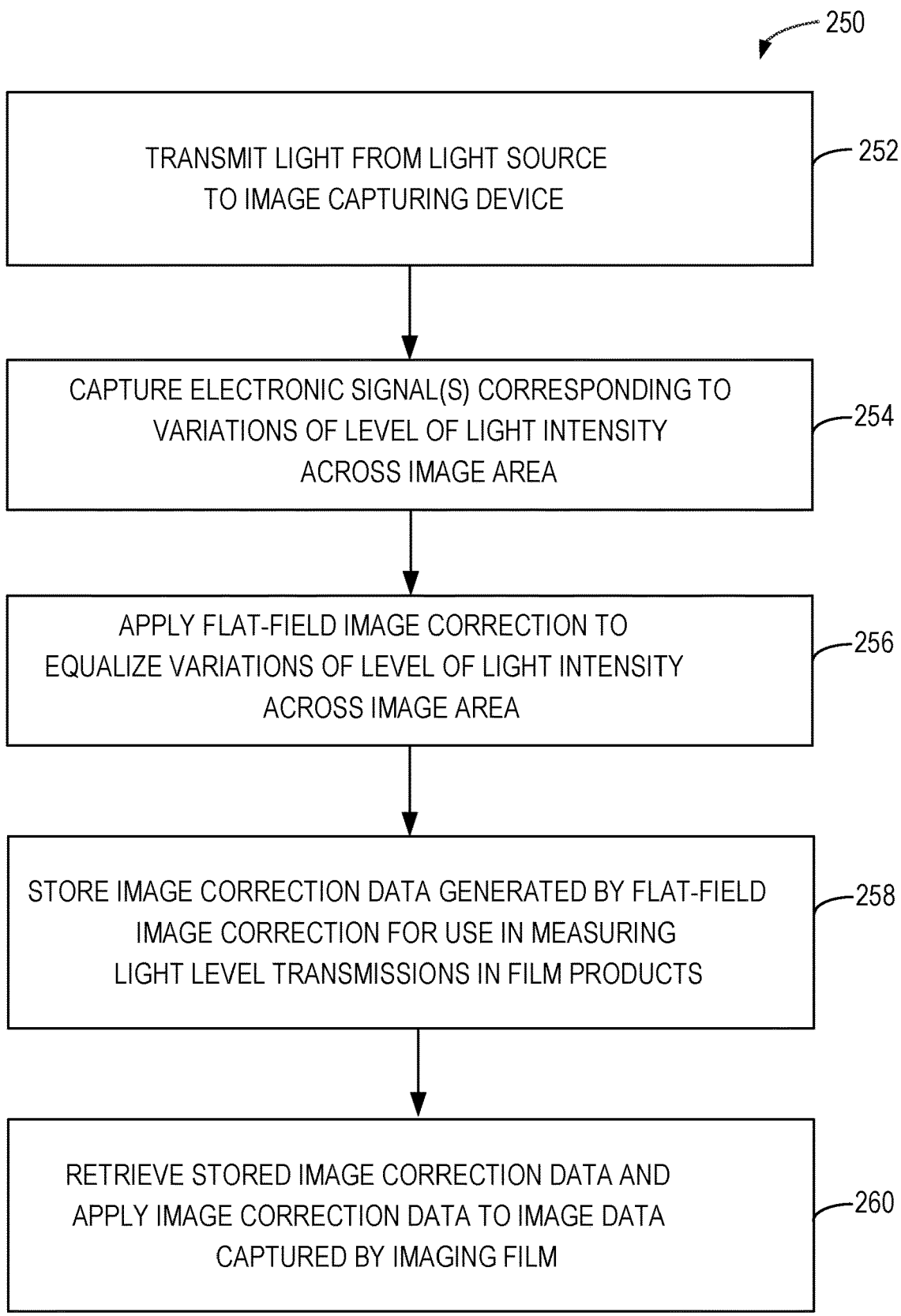
FIG. 7 is a flowchart illustrating one or more exemplary methods in accordance with various techniques described in this disclosure.

FIG. 7 is a flowchart illustrating an exemplary method 250 for calibration of a light transmission measurement system in accordance with various techniques described in this disclosure. Although method 250 is described as being performed by inspection system 150 as illustrated and described with respect to FIG. 3, execution of one or more steps of method 250 are not limited to being performed by the specific devices described with respect to inspection system 150, and may be performed, in part or in their entirety, by other devices arranged to perform the operations and to provide the features associated with performance of method 250.

Referring again to FIG. 7, method 250 includes transmitting a light from light source 151 to image capturing device 154 (block 252). No film is positioned between light source 151 and image capturing device 154 so that the full level of light intensity being generated by and transmitted from light source 151 is directed toward image capturing device 154 without any intervening attenuation due to a film. Exemplary system 150 utilizes light filter 158 positioned between light source 151 and image capturing device 154 so that the light generated by the light source passes through light filter 158 before being transmitted to the light capturing device.

Method 250 includes capturing, by image capturing device 154, electronic signals corresponding to the variations in the level of light intensity across the image area (block 254). Image capturing device may be any of the light imaging devices described throughout this disclosure, or any equivalents thereof configured to capture and measure properties associated with light incident on the image capturing device that falls within a particular wavelength or a range of wavelengths of light of interest with respect to the inspection of a film.

Method 250 includes applying flat-field image correction to the electronic signal to equalize variations in the level of light intensities measured across the imaged area (block 256). In some embodiments, the imaged areas comprise a series of pixels or other elements of a light sensor array of the image capturing device that extend across an area of the film from one outside edge of the film to opposite outside edge of the film along the entirety of a cross-web dimension of the film that is to be imaged by the image capturing device. The series of pixels may be calibrated using flat-field image corrections techniques, including any of the flat-field image correction techniques described in this disclosure, or any equivalents thereof.

Method 250 includes storing image correction data generated using the flat-field image correction data for use in measuring light level transmission in films (block 258). Image correction data may be stored in any type of electronic memory device (e.g., database 122 in FIGS. 1 and 3).

Method 250 includes retrieving the stored image correction data, and applying the image correction data to the image data captured by image capturing device 154 generated by the image capturing device when imaging a film (block 260).

The techniques of this disclosure may be implemented in a wide variety of computing devices, image capturing devices, and various combinations thereof. Any of the described units, modules or components may be implemented together or separately as discrete, but interoperable logic devices. Depiction of different features as modules, devices, or units is intended to highlight different functional aspects and does not necessarily imply that such modules, devices, or units must be realized by separate hardware or software components. Rather, functionality associated with one or more modules, devices, or units may be performed by separate hardware or software components, or integrated within common or separate hardware or software components. The techniques described in this disclosure may be implemented, at least in part, in hardware, software, firmware or any combination thereof. For example, various aspects of the techniques may be implemented within one or more microprocessors, digital signal processors (DSPs), application specific integrated circuits (ASICs), field programmable gate arrays (FPGAs), or any other equivalent integrated or discrete logic circuitry, as well as any combinations of such components, embodied in programmers (e.g., computing device 120 in FIGS. 1 and 3), acquisition computer 155 and fiducial mark reader 156 and fiducial mark controller 157 (FIG. 3), manufacturing processes 110 (FIGS. 1 and 3) and conversion control system 166 (FIG. 3). The terms "processor," "processing circuitry," "controller" or "control module" may generally refer to any of the foregoing logic circuitry, alone or in combination with other logic circuitry, or any other equivalent circuitry, and alone or in combination with other digital or analog circuitry.

For aspects implemented in software, at least some of the functionality ascribed to the systems and devices described in this disclosure may be embodied as instructions on a computer-readable storage medium such as random-access memory (RAM), read-only memory (ROM), non-volatile random-access memory (NVRAM), electrically erasable programmable read-only memory (EEPROM), FLASH memory, magnetic media, optical media, or the like that is tangible. A server, client computing device, or any other computing device may also contain a more portable removable memory type to enable easy data transfer or offline data analysis. The instructions may be executed to support one or more aspects of the functionality described in this disclosure. In some embodiments, a computer-readable storage medium comprises a non-transitory medium. The term "non-transitory" may indicate that the storage medium is not embodied in a carrier wave or a propagated signal. In some embodiments, a non-transitory storage medium may store data that can, over time, change (e.g., in RAM or cache).

Various aspects of this disclosure have been described. These and other aspects are within the scope of the following claims.

What is claimed is:

1. A method for calibrating a film inspection system, the method comprising:
   transmitting a light from a light source to an image capturing device of a film inspection system without a film present between the light source and the image capturing device;
   capturing, by the image capturing device, a plurality of electronic signals corresponding to the variations in light intensity levels imaged across an image area of the image capturing device;
   applying a flat-field image correction to the electronic signals to equalize variations in the levels of light intensities captured across the imaged area, the flat-field image correction including calibration of a raw image measurement using a dark current and a gain value for each of a plurality of pixels of the image capturing device capturing the transmitted light;
   storing image correction data generated using the flat-field image correction, the image correction data for use in measuring light level transmission in films; and
   applying the stored image correction data to sets of image data captured by the imaged capturing device generated by the image capturing device when imaging a film being advanced past the light source and the image capturing device.

2. The method of claim 1, wherein the light transmitted from the light source comprises infrared light having a wavelength of 940 nanometers.

* * * * *

UNITED STATES PATENT AND TRADEMARK OFFICE
CERTIFICATE OF CORRECTION

PATENT NO. : 11,327,010 B2
APPLICATION NO. : 16/965632
DATED : May 10, 2022
INVENTOR(S) : Joseph Raymond Nesbitt Page 1 of 1

It is certified that error appears in the above-identified patent and that said Letters Patent is hereby corrected as shown below:

In the Claims

<u>Column 30</u>
Line 16, In Claim 1, delete "the" between "corresponding to" and "variations".

Signed and Sealed this
Twenty-seventh Day of August, 2024

Katherine Kelly Vidal
*Director of the United States Patent and Trademark Office*